US006736877B2

(12) United States Patent
Harlamovs et al.

(10) Patent No.: US 6,736,877 B2
(45) Date of Patent: May 18, 2004

(54) HEAP BIOLEACHING PROCESS FOR THE EXTRACTION OF ZINC

(75) Inventors: Juris R. Harlamovs, Fruitvale (CA); Daniel W. Ashman, Trail (CA); Jose Alberto Gonzalez Dominguez, Fruitvale (CA); Hector M. Lizama, Castlegar (CA); Dilipkumar D. Makwana, Montrose (CA); Andrew W. Stradling, Rossland (CA)

(73) Assignee: Teck Cominco Metals Ltd., Vancouver (CA)

( * ) Notice: Subject to any disclaimer, the term of this patent is extended or adjusted under 35 U.S.C. 154(b) by 213 days.

(21) Appl. No.: 09/990,339

(22) Filed: Nov. 23, 2001

(65) Prior Publication Data

US 2003/0089201 A1 May 15, 2003

(30) Foreign Application Priority Data

Jul. 13, 2001 (CA) ................................. 2353002

(51) Int. Cl.$^7$ ................................ C22B 3/18

(52) U.S. Cl. .................... 75/431; 75/712; 205/605; 423/DIG. 17

(58) Field of Search .............. 75/431, 712, 961; 205/603, 604, 605; 423/DIG. 17

(56) References Cited

U.S. PATENT DOCUMENTS

| | | | |
|---|---|---|---|
| 2,829,964 A | 4/1958 | Zimmerley et al. | |
| 2,992,894 A | 7/1961 | Hazen et al. | |
| 3,214,239 A | 10/1965 | Hazen et al. | |
| 3,260,593 A | 7/1966 | Zimmerley et al. | |
| 3,305,353 A | 2/1967 | Duncan et al. | |
| 3,347,661 A | 10/1967 | Mayling | |

(List continued on next page.)

FOREIGN PATENT DOCUMENTS

| | | |
|---|---|---|
| AU | 654322 | 2/1992 |
| AU | 673929 | 12/1994 |
| AU | 4689/99 | 1/1999 |
| AU | 2651/99 | 9/1999 |
| AU | 199918524 | 9/1999 |
| CA | 960463 | 1/1975 |
| CA | 1023947 | 1/1978 |
| CA | 1308916 | 10/1992 |
| CA | 2054522 | 5/1993 |
| CA | 2113039 | 7/1995 |
| CA | 2155050 | 2/1996 |
| CA | 2241064 | 12/1999 |
| CA | 2275098 | 12/1999 |
| CA | 2305052 | 11/2000 |
| CA | 2306015 | 12/2000 |
| CA | 2307957 | 12/2000 |
| CA | 2309225 | 12/2000 |
| EP | 1258535 | 11/2002 |

(List continued on next page.)

OTHER PUBLICATIONS

1. *Latest developments in leaching technology for metal ores*, Sulphur, No. 269, 2000, pp. 31–40.

(List continued on next page.)

*Primary Examiner*—Melvyn Andrews
(74) *Attorney, Agent, or Firm*—Elbie R. de Kock

(57) ABSTRACT

A method of extracting zinc from a sulphidic ore is provided which comprises bioleaching the ore in a heap with acidophilic microorganisms to produce a pregnant leach solution which is recovered from the bottom of the heap. An integrated process which comprises subjecting the pregnant leach solution to neutralization and solvent extraction to produce a concentrated zinc solution is also provided. Zinc may be recovered from the concentrated solution by means of electrowinning, either in the absence or presence of manganese. Alternatively zinc may be recovered in the form of a zinc compound.

132 Claims, 16 Drawing Sheets

U.S. PATENT DOCUMENTS

| | | | |
|---|---|---|---|
| 3,455,679 | A | 7/1969 | Mayling |
| 3,573,182 | A | 3/1971 | Churchward et al. |
| 3,607,235 | A | 9/1971 | Duncan et al. |
| 3,679,397 | A | 7/1972 | O'Connor et al. |
| 3,777,004 | A | 12/1973 | Lankenau et al. |
| 3,923,976 | A | 12/1975 | Resige et al. |
| 3,989,607 | A | 11/1976 | Bush et al. |
| 4,017,309 | A | 4/1977 | Johnson |
| 4,124,462 | A | 11/1978 | Reinhardt et al. |
| 4,230,487 | A | 10/1980 | Demarthe et al. |
| 4,235,713 | A | 11/1980 | Diaz Nogueira et al. |
| 4,266,972 | A | 5/1981 | Redondo-Abad et al. |
| 4,348,056 | A | 9/1982 | Von Kohorn |
| 4,401,531 | A | 8/1983 | Martin San Lorenzo |
| 4,571,387 | A | 2/1986 | Bruynesteyn et al. |
| 4,610,722 | A | 9/1986 | Duyvesteyn et al. |
| 4,701,309 | A | 10/1987 | Ramachandran et al. |
| 4,721,526 | A | 1/1988 | Elmore et al. |
| 4,729,788 | A | 3/1988 | Hutchins et al. |
| 4,740,243 | A | 4/1988 | Krebs-Yuill et al. |
| 4,987,081 | A | 1/1991 | Hackl et al. |
| 5,005,806 | A | 4/1991 | Krauth |
| 5,196,052 | A | 3/1993 | Gross et al. |
| 5,228,903 | A | 7/1993 | O'Keefe |
| 5,244,493 | A | 9/1993 | Brierley et al. |
| 5,246,684 | A | 9/1993 | Brown et al. |
| 5,332,559 | A | 7/1994 | Brierley et al. |
| 5,358,700 | A | 10/1994 | Brown et al. |
| 5,397,380 | A | 3/1995 | Petersson et al. |
| 5,402,991 | A | 4/1995 | Schindler |
| 5,413,624 | A | 5/1995 | Rusin et al. |
| 5,429,659 | A | 7/1995 | Spencer et al. |
| 5,573,575 | A | 11/1996 | Kohr |
| 5,763,259 | A | 6/1998 | Panos |
| 5,800,593 | A | 9/1998 | Kohr |
| 5,834,294 | A | 11/1998 | Brierley et al. |
| 5,873,927 | A | 2/1999 | Schaffner et al. |
| 5,914,441 | A | 6/1999 | Hunter et al. |
| 5,919,674 | A | 7/1999 | Tunley |
| 5,948,375 | A | 9/1999 | Stallknecht |
| 6,043,022 | A | 3/2000 | Lucking et al. |
| 6,053,964 | A | 4/2000 | Harrell |
| 6,063,158 | A | 5/2000 | Sharp et al. |
| 6,086,656 | A | 7/2000 | Kohr et al. |
| 6,096,113 | A | 8/2000 | Schaffner et al. |
| 6,099,615 | A | 8/2000 | Underwood |
| 6,103,204 | A | 8/2000 | Lizama et al. |
| 6,110,253 | A | 8/2000 | Kohr et al. |
| 6,146,444 | A | 11/2000 | Kohr |
| 6,149,711 | A | 11/2000 | Lane |
| 6,159,726 | A | 12/2000 | Kohr |
| 6,168,766 | B1 | 1/2001 | Imai et al. |
| 2003/0034301 | A1 * | 2/2003 | Perriello ............ 210/611 |

FOREIGN PATENT DOCUMENTS

| | | |
|---|---|---|
| RU | 2065952 | 12/1991 |
| WO | WO 92/16667 | 10/1992 |
| WO | WO 00/23629 | 4/2000 |
| WO | WO 00/29629 | 5/2000 |
| WO | WO 00/71763 | 11/2000 |
| WO | WO 01/16385 | 3/2001 |
| WO | WO 01/18264 | 3/2001 |
| WO | WO 01/18266 | 3/2001 |
| WO | WO 01/33693 | 5/2001 |
| WO | WO 01/44519 | 6/2001 |
| WO | WO 01/44520 | 6/2001 |
| WO | WO 00/75184 | 10/2001 |
| WO | WO 02/066708 | 8/2002 |
| ZA | 995892 | 9/1999 |

OTHER PUBLICATIONS

2. *Working with 'mini–miners': Is this the true way ahead?*, International Mining and Minerals, 1999, pp. 323–325.

3. Ballester, A. et al, *Kinetic study of bioleaching of mineral sulphides: sphalerite and complex sulphide*, Erzmetall, vol. 42, No. 2, 1989, pp. 62–65.

4. Bartlett, R.W. et al, *Oxygen diffusion into wet ore heaps impeded by water vapor upflow*, Global Exploitation of Leachable.

Gold Deposits, Hausen, D.M. (ed.), The Minerals, Metals and Materials Society, 1997, pp. 85–94.

5. Bartlett, R.W., *Metal extraction from ores by heap leaching*, Metallurgical and Materials Transactions B, vol. 28B, 1997, pp. 529–545.

6. Boon, M. et al, *Mechanisms and rate limiting steps in bioleaching of chalcopyrite and pyrite with Thiobacillus ferrooxidans*, Biohydrometallurgical Technologies, Torma, A.E. et al. (eds.), The Minerals, Metals and Meterials Society, 1993, pp. 217–235.

7. Boon, M. et al., *Recent developments in modelling bio–oxidation Kinetics. Part II: kinetic modelling of the bio–oxidation of sulphide minerals in terms of the critical sub–processes involved*, Mineral Bioprocessing II, Homles, D.S. et al. (eds.), The Minerals, Metals and Materials Society, 1995, pp. 63–82.

8. Brierley, C.L., *Bacterial succession in bioheap leaching*, hydrometallurgy, vol. 59, 2001, pp. 249–255.

9. Brierley, C.L. et al, *Bioheap processess—operational requirements and techniques*, Copper Leaching, Solvent Extraction, and Electrowinning Technology, Society of Manufacturing Engineers, 1999, pp. 17–27.

10. Brierley, C.L. et al, *Copper bioleaching: state–of–the–art*, Proceedings of Copper 99, vol. IV—Hydrometallurgy of Copper, Young S.K. et al. (eds.), The Minerals, Metals and Materials Society, 1999, pp. 59–68.

11. Brierley, J.A. et al., *Present and future commercial applications of biohydrometallurgy*, Hydrometallurgy, vol. 59, 2001, pp. 233–239.

12. Carranza, F. et al, *Selective cyclic bioleaching of a copper–zinc sulphide concentrate*, Hydrometallurgy, vol. 24, 1990, 67–76.

13. Crundwell, F.K., Effect of iron impurity in zinc sulfide concentrates on the rate of dissolution, AIChe, vol. 34, No. 7, 1988, pp. 1128–1134.

14. Dutrizac, J.E., *Ferric sulphate percolation leaching of a pyritic Zn–Pb–Cu ore*, CIM Bulletin, vol. 72, No. 810, 1979, pp. 109–118.

15. Fowler, T.A., et al, *Leaching of zinc sulfide by Thiobacillus ferrooxidans: Bacterial oxidation of the sulfur product layer increases the rate of zinc sulfide dissolution at high concentrations of ferrous ions*, Applied and Environmental Microbiology, vol. 65, No. 12, 1999, pp. 5285–5292.

16. Hearne, T.M. et al., *Hydrometallurgical recovery of zinc from sulphide ores and concentrates*, Zinc and Lead Processing, Dutrizac, J.E. et al. (eds.), The Metallurgical Society of CIM, 1998, pp. 765–780.

17. Herkenhoff, E.C. et al., *Heap leaching: agglomerate or deslime?*, Engineering and Mining Journal, vol. 188, No. 6, 1987, pp. 32–33, 38–39.

18. Kinard, D.T. et al, *Engineering properties of agglomerated ore in a heap leach pile*, Dames & Moore, Golden, 1987, pp. 55–64.

19. Komnitsas, C., *Amenability of zinc sulphide overburden and tailings to biooxidation*, Oryktos Ploutos, vol. 93, 1994, pp. 37–43.
20. Konishi, Y. et al, *Bioleaching of zinc sulfide concentrate by Thiobacillus ferroxidans*, Biotechnology and Bioengineering, vol. 39, 1992, pp. 66–74.
21. Krafft, C. et al, *Bacterial leaching of two Swedish zinc sulfide ores*, FEMS Microbiology Reviews, vol. 11, 1993, pp. 121–128.
22. LeHoux, P.L., *Agglomeration practice at Kennecott Barneys Canyon Mining Co.*, Global Exploitation of Leachable Gold Deposits, Hausen, D.M. (ed.), The Minerals, Metals and Materials Society, Warrendale, PA, 1997, pp. 243–249.
23. Lizama, H. et al., *Baterial leaching of a sulfide ore by Thiobacillus ferroxidans and Thiobacillus thiooxidans: I. Shake flask studies*, Biotechnology and Bioengineering, vol. 32, 1988, pp. 110–116.
24. Lizama, H. et. al., *Bacterial leaching of a sulfide ore by Thiobacillus ferroxidans and Thiobacillus thiooxidans: II. Colum leaching studies*, Hydrometallurgy, vol. 22, 1989, pp. 301–310.
25. McClelland, G.E. et al, *Agglomeration–heap leaching operation in the precious metals industry*, Bureau of Mines Information Circular 8945, United States Department of the Interior, 1983.
26. McClelland, G.E. *Comparison of agglomerated versus unagglomerated heap leaching behavior in production heaps*, for presentation at the SME Annual Meeting, New Orleans, LA, Mar. 26, 1986 (Preprint No. 86–66).
27. Miller, P.C. et al, *Commercialization of bioleaching for base metal extraction*, Minerals and Metallurgical Processing, vol. 16 No. 4, 1999, pp. 42–50.
28. Nilsson, L. et al., *A new process for the zinc recovery from bacterial leach solutions*, Scandinavian Journal of Metallurgy, vol. 25, 1996, pp. 161–171.
29. Pantelis, G. et al., *Optimising oxidation rates in heaps of pyritic material*, Biohydrometallurgical Technologies, Torma, A.E et al (eds.), The Minerals, Metals and Materials Society, 1993, pp. 731–738.
30. Sand W. et al., *Controlled microbiological in–situ stope leaching of a sulphidic ore*, Applied Microbiology and Biotechnology, vol. 40, 1993, pp. 421–426.
31. Sandstrom, A. et al., *Bio–oxidation of a complex zinc sulphide ore: a study performed in continuous bench–and pilot scale*, International Biohydrometallurgy Symposium—Biomine 97, Australian Mineral Foundation Conference, Glenside, Australia, 1997, pp. M1.1–M1.1.11.
32. Selvi, S.C. et al, *Electrobioleaching—A novel concept for processing complex sulphide ores*, Transactions of the Indian Institute of Metallurgy, vol. 51, No. 1, 1998, pp. 17–26.
33. Shield, J.W. et al, *Novel method for heap biooxidation of sulfide*, for presentation at the SME Annual Meeting, Denver, Co, Feb. 24–27, 1997 (Preprint No. 97–183).
34. Steemson, M.L. et al., *The integration of zinc bioleaching with solvent extraction for the production of zinc metal from zinc concentrates*, International Biohydrometallurgy Symposium—Biomine 97, Australia 1997, pp. M1.4.1–M1.1.10.
35. Torma, A.E. et al., *The effect of carbon dioxide and particle surface area on the microbiological leaching of a zinc sulfide concentrate*, Biotechnology and Bioengineering, vol. XIV, 1972, pp. 777–786.
36. Torres, F. et al, *The bioleaching of different sulfide concentrates using thermophilic bacteria*, Metallurgical and Materials Transactions B, vol. 26B, 1995, pp. 455–465.
37. Belew, B. et al., *Reductive stripping of iron(III) from Di 2–ethylhexyl phosphoric acid*, Hydrometallurgy: Fundamentals, Technology and Innovations, Hiskey, J.B. et al. (eds.), Society for Mining, Metallurgy, and Exploration, Inc., Littleton, CO, 1993, pp. 817–830.
38. Dalton, D.F. et al., *Novel solvent extraction reagents— the key to new zinc processing technology*, Matthew, I.G. (ed.), Worl Zinc '93, The Australasian Institute of Mining and Metallurgy, Victoria, Australia, 1993, pp. 347–355.
39. Diaz, G. et al., *Coping with zinc secondary materials: the modified Zincex route*, Recycling Lead and Zinc: the Challenge of the 1990s, International Lead and Zinc Study Group, London, UK, 1991, pp. 337–359.
40. Diaz, G. et al., *Zinc recycling through the modified Zincez process, 3$^{rd}$* International Symposium on Recycling of Metals and Engineered Materials, Queneau, P.B. et al. (ed.), The Minerals, Metals and Materials Society, Warrendale, PA, USA, 1995, pp. 623–635.
41. Dreisinger, D. et al., *The solvent extraction—electrowinning recovery of zinc from Eskay Creek pressure oxidation solutions using Cyanex 302 extractant*, Matthew, I.G. (ed.), World Zinc '93, The Australasian Institute of Mining and Metallurgy, Victoria, Australia, 1993, pp. 357–363.
42. Figueiredo, J.M. et al., *The CENIM–LNETI process for zinc recovery from complex sulphides*, Matthew, I.G. (ed.), World Zinc'93, The Australasian Institute of Mining and Metallurgy, Victoria, Australia, 1993, pp. 333–339.
43. Garcia, M.A. et al., *Upcoming zinc mine projects: the key for success is Zincex solvent extraction*, Lead–Zinc 2000, Dutrizac, J.E. et al. (eds.), The Minerals, Metals and Materials Society, 2000, pp. 751–761.
44. Lupi, C. et al, *A hydrometallurgical way to recover zinc and lead from EAF dusts*, EPD Congress, Mishra, B. (ed.), The Minerals, Metals and Materials Society, 1999, pp. 621–629.
45. Monhemius, J., Hydrometallurgical processing of complex materials, Chemistry and Industry, Issue 13, Jun. 20, 1981, pp. 410–420.
46. Neira, M. et al., *Solvent extraction reagent entrainment effects on zinc electrowinning from waste oxide leach solutions*, Minerals Engineering, vol. 5, nos. 3–5, 1992, pp. 521–534.
47. Nogueira, E.D. et al, *Design features and operating experience of the Quimigal Zincex plant*, Chloride Electrometallurgy, Metallurgical Society of AIME, Warrendale, PA. USA, 1982 pp. 59–76.
48. Nogueira, E.D. et al, *Using zinc secondaries to feed an electrowinning plant*, Zinc '85, 1985, pp. 763–781.
49. Nogueira, E.D. et al., *Winning zinc through solvent extraction and electrowinning*, Engineering and Mining Journal, vol. 180, No. 10, 1979, pp. 92–94.
50. Nogueira, E.D. et al, *Zincex—the development of a secondary zinc process*, Chemistry and Industry, No. 2, 1980, pp. 63–57.
51. Selke, A. et al, *Zinc recovery by solvent extraction*, Productivity and Technology in the Metallurgical Industries, Koch, M. et al. (eds.), The Mineralss, Metals and Meterials Society, 1989, pp. 695–703.

\* cited by examiner

HEAP BIOLEACHING PROCESS FOR THE EXTRACTION OF ZINC

FIELD OF THE INVENTION

This invention relates to the bioleaching of zinc from an ore, such as a sulphidic ore, in a heap.

BACKGROUND TO THE INVENTION

Conventional processes for the extraction of zinc mostly involve crushing, grinding and concentration of the ore and then roasting of the resulting concentrate followed by leaching, purification and electrowinning of the zinc. Metals such as copper, nickel and gold have been extracted using heap leaching. See for example U.S. Pat. Nos. 6,168,766; 6,110,253; 4,017,309; 5,196,052; and 4,721,526 where several copper and gold extraction processes are described. Heap leaching of nickel is described in Canadian Patent Application No. 2,155,050. Typically the heap leaching is applied to low grade ores, e.g. <5 g/t for gold and <1% for copper. Therefore, the part of the heap representing the metal being extracted is relatively small compared to the total amount of material in the heap. Nevertheless, the value of the metal being extracted renders the application of heap leaching for these metals economically feasible. Since small amounts of material are leached from such heaps, problems related to decrepitation, slumping and compaction are relatively minor concerns.

Zinc has a lower market value than copper or gold and particularly where the higher grade zinc ores are concerned, the tried and tested methods of concentrate roasting, leaching and electrowinning have been employed for the extraction of the ore. To the applicant's knowledge there are no commercial heap bioleach processes in operation for the extraction of zinc. Therefore, despite the fact that heap leaching has changed the economics in so far as the recovery of gold and copper is concerned, this has not been applied to the recovery of zinc.

A reason for this may be the expectation that leaching of zinc presents problems unique to the heap leaching of zinc ores, such as the precipitation of iron oxides within the heap. Australian Patent Application No. 654322 states that a particular problem of treatment of transition ores in-situ or in heap is the tendency for iron present in the ore or in the treating liquor to precipitate as an insoluble precipitate leading to percolation problems.

While problems relating to decrepitation, slumping and compaction are relatively minor concerns in the heap leaching of copper and gold, these problems threaten to become major concerns with zinc ore leaching where considerable physical changes of the ore, especially with run-of-mine ores of good grade, can be encountered. These changes might be expected to result in percolation and irrigation problems, such as flooding, channelling and cold spots. In addition, permeability problems might be expected in view of the larger amounts of material that need to be leached from the heap in order to render the process economically feasible.

A bioleaching process for the recovery of zinc is described in WO01/18266 but this process is carried out in a reactor tank or vessel and employs oxygen enrichment in order to render the process feasible.

U.S. Pat. No. 6,096,113 describes a tank/heap biooxidation process for recovering a metal from a refractory sulphide ore by splitting the ore in two portions. The first portion is partially biodigested in a reactor to acclimatize the sulphide-digestion microorganism. The partially digested ore is then combined with the second portion. The resulting material is dewatered, biooxidized and subjected to lixiviation.

U.S. Pat. No. 5,429,659 describes a process for recovering precious or base metals from particulate refractory sulphide material comprising contacting the material with an aqueous solution containing a thermotolerant bacteria culture.

Hearne et al (1) propose a process for the recovery of zinc from its sulphide ores or concentrates by an entirely hydrometallurgical route. It consists of bacteria-assisted heap-leaching of sphalerite ore, or leaching zinc concentrate at elevated temperatures with ferric sulphate and re-oxidising the formed ferrous iron with the aid of bacteria in a ferric ion generator. The results of column leaching of different sized ores are reported. The economic feasibility of a moderate-scale heap leach operation is assessed but the authors conclude that for the purely hydrometallurgical recovery route for zinc, industrial acceptance is still some time away until the technology is fully developed and demonstrated on a large scale. The authors further conclude that heap leaching may be beneficial to recover zinc from marginal ore and foresee a process development stage in which a small heap leach/solvent extraction/electrowinning plant is incorporated as an "add on" to another process, i.e. there is no teaching of heap leaching being operated as a stand alone process. The authors also state that zinc solvent extraction, crucial to both ore and concentrate leaching, is not yet satisfactorily solved.

Konishi et al (2) have reported on the kinetics of the bioleaching of ZnS concentrate by *Thiobacillus ferrooxidans* in a well-mixed batch reactor. Experimental studies were done at 30° C. and pH 2.2 on adsorption of the bacteria to the mineral, ferric iron leaching and bacterial leaching. A mathematical model for bioleaching is presented for quantitatively examining the effects of certain operating variables with the object of selecting optimum bioleaching conditions for zinc concentrates.

Sandström et al (3) have performed bioleaching with moderate thermophilic bacteria at 45° C. and with extreme thermophilic archaea at 60° C. on a complex zinc sulphide ore. The ore was fine grained and contained refractory gold as an additional value. The bioleaching was carried out in continuous stirred tank reactors and although the authors conclude that biooxidation of a complex zinc sulphide ore at 45° C. and 65° C. has proven to be a viable process, especially at the higher temperature, the ore must be finely ground (20 to 28 microns) in order to obtain high zinc recoveries at modest pyrite oxidation.

U.S. Pat. No. 4,401,531 describes a process for the recovery of zinc from secondary zinc raw materials by leaching followed by solvent extraction and electrowinning. However, again the leaching is carried out in stirred tank reactors and in this case no bio-leaching is involved.

Steemson et al (4) describe a process for zinc metal production from zinc concentrates by integrating zinc bioleaching with zinc solvent extraction and electrowinning. The bioleaching again was carried out in reactor tanks. The temperature was controlled at 40° C. to 45° C. In carrying out the process, the concentrate was slurried in water to produce a 6.5% w/w slurry which is then fed to the reactor tanks. See Australian Patent No. 673929 where the Steemson et al process is more fully described.

Krafft et al (5) report on the leaching of two Swedish zinc sulphide ores in columns. Five grain sizes ranging from 4 mm to 128 mm were used. The authors state that, despite intermittent sulphuric acid additions, pH values varied between 2.5 and 3.5 most of the time and it was impossible to avoid precipitation of iron compounds in the columns with the result that for the two smallest grain size fractions of the one ore, the column was clogged by precipitates of iron to such an extent that the leachate could not penetrate the ore mass.

Dutrizac (6) reports on ferric sulphate perolation leaching of a pyritic Zn—Pb—Cu ore and states that zinc recovery from acidic iron-bearing solutions is difficult and that much work still needs to be done in this regard. It is further stated that the problem is especially severe for low zinc concentrations. Problems were also encountered when attempts were made to use higher iron concentrations since part of the iron precipitated.

In light of the above it can be seen that heap bioleaching of ore on its own, or in combination with solvent extraction and electrowinning, has not been established or proven as a viable process for the extraction of zinc on a commercial scale vis-à-vis the conventional processes involving roasting of the concentrate or the bioleaching of finely-ground zinc concentrates in reaction tanks where temperature, pH and bacteria concentration would be expected to be more even than with heap leaching.

It is an object of the present invention to provide a process for the extraction of zinc from an ore by means of heap bioleaching the ore and also to provide an integrated zinc extraction process which includes solvent extraction to produce a pure concentrated zinc solution for the production of zinc metal by electrowinning or for the production of zinc compounds. The invention is the basis of the Cominco HydroZinc™ process.

SUMMARY OF THE INVENTION

According to the invention there is provided a method of extracting zinc from a sulphidic ore, comprising the steps of selecting a sulphidic ore having a maximum particle size of about 50 mm; forming the ore into a heap and bio-oxidizing the ore in the heap with acidophilic microorganisms by providing air to the bottom of the heap at a rate of at least 5 L/m$^2$·min; and irrigating the top of the heap with an acidic solution containing up to about 30 g/L sulphuric acid at a rate of at least about 0.15 L/m$^2$·min to produce a pregnant leach solution containing zinc in solution; and recovering zinc from the pregnant leach solution.

The units L/m$^2$·min represent a volumetric flow rate (L/min) per unit area (m$^2$) of the heap taken in plan view (i.e. in horizontal cross-section).

The acidic solution may contain from about 15 g/L to about 30 g/L sulphuric acid.

The pregnant leach solution may be subjected to solvent extraction to obtain a concentrated zinc solution and a raffinate. Preferably, zinc is only partially extracted during the solvent extraction. The amount of zinc extracted may be typically about 30% to 50% of the zinc in the pregnant leach solution. Thus, because less acid is generated in the solvent extraction, the solvent extraction may be carried out in stages without requiring neutralization between stages.

The concentrated zinc solution may be subjected to electrowinning to produce zinc metal. Alternatively, zinc may be recovered from the concentrated zinc solution in the form of a compound, such as zinc hydroxide, zinc sulphate, zinc oxide, zinc carbonate or zinc oxalate.

The ore may be derived from a sedimentary exhalative type deposit or a volcanogenic massive sulphide type deposit or, less preferably, from a carbonate replacement deposit.

The ore may also, for example, be any one of the following ores that still contains some sulphidic minerals: a complex ore, mixed ore, weathered ore, partially oxidized ore, oxidic ore and siliceous ore.

The ore may be a good grade run-of-mine ore containing at least 5% zinc or at least 10% and even more than 20% zinc but it may also contain a lesser amount, such as at least 3% zinc, if economically feasible. The process may also be applicable to low grade dump material of various grades.

The bio-oxidizing of the ore may be carried out at an average temperature of about 30° C. to 85° C., preferably about 35° C. to 70° C. The autogenous heating of the heap, from the heat of reaction, assists the leaching process.

The microorganisms may be indigenous to the ore or the ore may be inoculated with the microorganisms, e.g. by adding a culture or a solution containing the microorganisms, such as mine drainage solution with indigenous microorganisms, to the ore. Given the wide temperature range, the nature of the microorganisms can vary in the heap.

The process may further comprise the step of providing nutrient to the microorganisms. The nutrient may comprise nitrogen in the form of an ammonium salt and a source of potassium and phosphorous.

The ore may be a complex zinc-containing ore. It may be a zinc-copper ore in which case the pregnant leach solution contains both zinc and copper in solution. The zinc and copper may be recovered in separate solvent extraction circuits, e.g. copper may be extracted prior to removal of the zinc.

The ore may be derived from a sedimentary exhalative type deposit or a volcanogenic massive sulphide type deposit. The ore may contain zinc in the form of a zinc sulphide mineral, such as sphalerite, marmatite or wurtzite.

The heap may have a height of at least 2 meters, for practical reasons. The maximum height of the heap may also be limited due to certain physical constraints. It may have a height of from about 2 to 10 meters, preferably about 4 to 8 meters. Different configurations of heaps are possible from an engineering point of view.

The ore may be agglomerated before forming into the heap. The agglomeration may be effected with solutions at different acid strengths, including concentrated acid, depending on ore type and neutralization characteristics of the ore. The solution used for agglomeration may contain iron. The agglomeration may also be effected with pregnant leach solution, raffinate from the zinc solvent extraction or acid mine drainage.

The microorganisms may be mesophiles, thermophiles or extreme thermophiles, which are categories according to temperature ranges for growth. In this specification, mesophiles are those microorganisms that grow in the moderate temperature range up to about 45° C. Thermophiles are heat-loving organisms having an optimum growth temperature in the range of 45° C. to 60° C. Extreme thermophiles have an optimum growth temperature above 60° C. As mentioned above, the microorganisms may vary according to the temperatures in the heap.

These microorganisms may be selected from the following non-limiting examples of genus groups and species:

Acidithiobacillus spp. (Acidithiobacillus ferrooxidans, Acidithiobacillus thiooxidans, Acidithiobacillus caldus), Leptospirillum ssp. (Leptospirillum ferrooxidans); Acidiphilium spp. (Acidiphilium cryptum); Ferromicrobium acidophilus; Ferroplasma

*acidiphilum*; *Sulfobacillus spp.* (*Sulfobacillus thermosulfidooxidans, Sulfobacillus acidophilus*); *Alicyclobacillus spp.* (*Alicyclobacillus acidocaldrius*); *Acidimicrobium ferrooxidans; Sulfolobus spp.* (*Sulfolobus metallicus*); *Acidianus spp.* (*Acidianus infernus*); *Metallosphaera spp.* (*Metallosphaera sedula*); *Thermoplasma spp.* (*Thermoplasma acidophilum*).

According to another aspect of the invention the heap leaching may be effected with an acidic solution containing at least 30 g/L sulphuric acid.

Further according to the invention there is provided a method of extracting zinc from a sulphidic ore, comprising the steps of heap leaching the ore with an acidic leach solution in the presence of acidophilic microorganisms to produce a pregnant zinc solution; subjecting the pregnant zinc solution to zinc solvent extraction to obtain a manganese-free concentrated zinc solution and a raffinate; and subjecting the concentrated zinc solution to electrowinning to recover zinc therefrom, wherein the electrowinning is carried out in the absence of manganese in the concentrated zinc solution.

Also according to the invention there is provided a method of extracting zinc from a sulphidic ore also containing iron, comprising the steps of subjecting the ore to a heap leach with an acidic solution in the presence of acidophilic microorganisms to produce a pregnant leach solution containing zinc and iron; subjecting the leach solution to neutralization without the benefit of forced air flow to the leach solution, thereby maintaining the presence of the ferrous iron in the neutralized solution; subjecting the neutralized solution to zinc solvent extraction with an organic extractant to produce a loaded extractant and a raffinate containing ferrous iron in solution; stripping the loaded organic with an aqueous solution to produce a concentrated zinc solution; and recycling at least part of the raffinate to the heap leach. Furthermore, a portion of the pregnant leach solution, which contains iron, may be recycled to the heap so that the iron may assist in the leaching process.

The acidic solution preferably has sufficient acid content such that iron precipitation in the heap is avoided.

The pregnant leach solution may have a pH$\leq$4. It may have a pH$\leq$3.0 but preferably pH$\leq$2.5.

Further according to the invention there is provided a method of extracting zinc from a zinc solution, comprising the steps of subjecting the zinc solution to zinc solvent extraction to obtain a manganese free concentrated zinc solution and a raffinate; and subjecting the concentrated zinc solution to electrowinning to recover zinc therefrom, wherein the electrowinning is carried out in the absence of manganese in the concentrated zinc solution.

The zinc solution may be obtained by leaching a zinc ore or concentrate or by the leaching of an electric arc furnace dust or a recyclable zinc containing material.

Further objects and advantages of the invention will become apparent from the description of preferred embodiments of the invention below.

BRIEF DESCRIPTION OF THE DRAWINGS

The invention is now described by way of example with reference to the accompanying drawings, in which.

DETAILED DESCRIPTION OF PREFERRED EMBODIMENT

Figure 1:
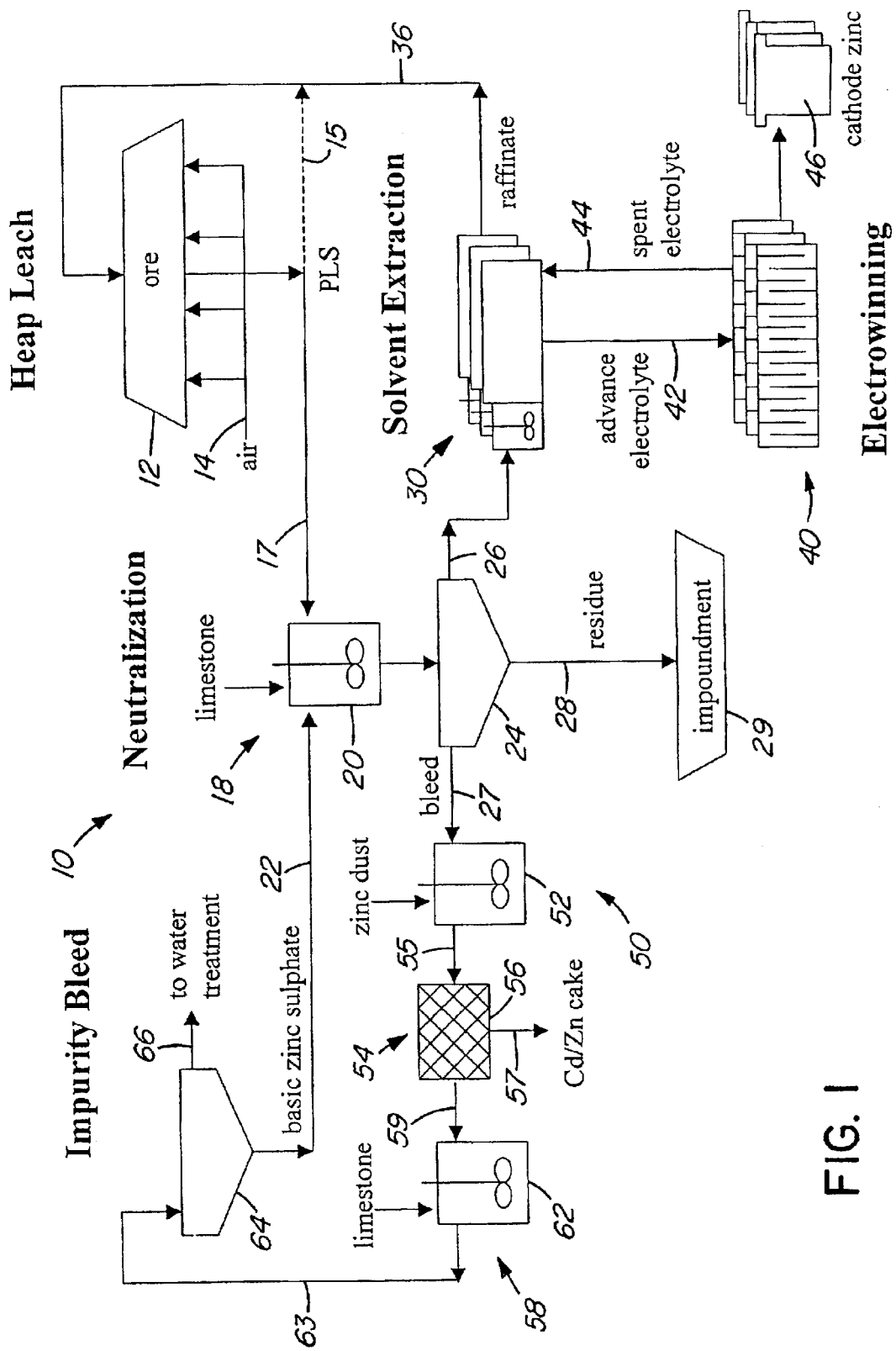
FIG. 1 is a flow diagram of an integrated biohydrometallurgical process for zinc production.

With reference to FIG. 1, reference numeral 10 generally indicates a heap bioleach process in which a sulphidic zinc ore is formed into a heap 12 on a pad, which heap 12 is leached with an acidic leach solution. This process is the basis of Cominco's HydroZinc™ process.

Examples of the type of ore which can be used are a sedimentary exhalative type ore and a volcanogenic massive sulphide type ore containing zinc in the form of a zinc sulphide mineral, such as sphalerite, marmatite or wurtzite.

The ore contains at least 3% zinc and preferably at least 5% zinc but may contain up to at least 10% and even more than 20% zinc.

Prior to forming the ore into the heap 12, it is crushed, if necessary, to reduce the ore to a maximum particle size of about 50 mm, preferably 25 mm and most preferably 12 mm. After crushing, the ore is preferably subjected to agglomeration to bind the fine material in the ore. Agglomeration can be effected with liquids such as water or an acidic solution, e.g. acid mine drainage, or solutions with a wide range of acidities, even very high acidic solutions to overcome neutralizing components in the ore. As indicated above, pregnant leach solution or raffinate may also be used.

The height of the heap 12 is preferably about 6 meters.

The heap 12 is installed with irrigation lines at the top and pregnant solution collection lines and an air distribution system 14 at the bottom.

The top of the heap 12 is irrigated with an acidic solution, typically with raffinate from the zinc solvent extraction described below, containing up to about 30 g/L sulphuric acid at a rate of about 0.15 L/m$^2$·min to extract zinc from the ore in the heap 12 at an average rate of about 2.5 kg/m$^2$·d or higher. In this way, the average concentration of zinc in the acid solution is increased by up to 20 g/L during passage though the heap 12 to produce a pregnant leach solution (PLS) which is collected in the pregnant solution collection lines.

As stated above, the irrigation of the top of the heap 12 is typically effected with raffinate from the zinc solvent extraction, described below. This raffinate contains iron which assists with the leaching in the heap 12. Optionally, as indicated by the broken line 15 in FIG. 1, a portion of the pregnant leach solution, which also contains iron, can be recycled to the heap 12 as well.

The heap is designed and operated at an average temperature of at least about 35° C. Heat is provided by the exothermic reactions taking place in the heap and no external heat input is required except that heat, such as recovered from a subsequent electrowinning stage 40, may be used during start up.

Air is provided to the bottom of the heap 12 by means of the air distribution system 14 at a rate of at least about 5 L/m²·min. Apart from being required for the biooxidation, the air can also be used for modifying the temperature in the heap or to realize higher temperatures for thermophilic leaching.

Reaction (1) gives the chemical leaching of zinc sulphide mineral (sphalerite) in the ore by ferric ion.

$$ZnS + 2Fe^{3+} \rightarrow Zn^{2+} + 2Fe^{2+} + S° \tag{1}$$

Reaction (2) relates to the biological oxidation of ferrous ion.

$$4Fe^{2+} + 4H^+ + O_2 \rightarrow 4Fe^{3+} + 2H_2O \tag{2}$$

Reaction (3) summarizes the biologically-assisted leaching of zinc sulphide mineral and is the overall reaction derived from reactions (1) and (2).

$$ZnS + 2H^+ + 0.5O_2 \rightarrow Zn^{2+} + H_2O + S° \tag{3}$$

Reaction (4) relates to the biological oxidation of elemental sulphur and occurs with increasing temperatures within the heap.

$$S° + 1.5O_2 + H_2O \rightarrow H_2SO_4 \tag{4}$$

Reaction (5) gives the biological oxidation of pyrite in the ore and is a source of heat generation within the heap.

$$2FeS_2 + 7.5O_2 + H_2O \rightarrow Fe_2(SO_4)_3 + H_2SO_4 \tag{5}$$

The pregnant leach solution is collected from the leach pad by the pregnant solution collection lines, which typically comprise a system of perforated collection pipes. The collection pipes are connected to a manifold which drains to a pond or tank.

The pregnant leach solution at a zinc concentration of about 20 to 40 g/L has picked up about 10 to 20 g/L zinc passing through the heap. The pregnant leach solution is recovered from the bottom of the heap at a temperature of at least 35° C.

Contrary to the literature, problems related to iron precipitation in the heap 12 are avoided by the level of acidity in the heap 12, by using sufficiently acidic solutions to irrigate the heap 12, thereby counteracting iron precipitation at lower levels of the heap 12. For example, the pH of the pregnant leach solution recovered from the bottom of the heap 12 is preferably less than about 2.5. Problems related to decrepitation are also avoided. Microscopic examination of a leached ore sample indicates that the zinc mineral in the ore is attacked leaving a lattice that is a factor in overcoming permeability problems.

After collection, the pregnant leach solution is piped (line 17) to a neutralization stage 18, which comprises a number of agitated tanks 20 in series (only one being shown) with a typical total retention time of approximately 90 to 180 minutes, depending on the reactivity of the neutralizing agent. As referred to above, a portion of the pregnant leach solution may be recycled to the heap 12. Basic zinc sulphate from a bleed treatment circuit (see below) is added to the first of the tanks 20 to dissolve contained zinc, as shown by line 22. The basic zinc sulphate also performs a neutralizing function.

The neutralization 18 is effected with a suitable neutralization agent, such as limestone slurry, to adjust the pH of the pregnant leach solution to a pH of between about 4 and 4.5 to remove ferric iron and other impurities as a neutralized sludge containing gypsum and hydrated iron oxide precipitates for containment and disposal.

Forced aeration is not employed during neutralization 18 as is done in conventional processes, i.e. the conversion of ferrous iron to ferric iron is not necessary, because the subsequent zinc solvent extraction stage (30), to be described below, can accommodate small amounts of ferrous iron oxidation and it is further desirable to have iron in the raffinate returning to the heap 12 (see below).

The neutralization of acid and precipitation of ferric iron in the pregnant leach solution are given by reactions (6) and (7).

$$CaCO_3 + H_2SO_4 \rightarrow CaSO_4 + CO_2 + H_2O \tag{6}$$

$$3CaCO_3 + Fe_2(SO_4)_3 + H_2O \rightarrow 3CaSO_4 + 2FeOOH + 3CO_2 \tag{7}$$

The slurry from the last neutralization tank 20 is discharged to a clarifier 24 where flocculant is added. The clarified solution 26 is then filtered (not shown) to remove any remaining fine particulate material. A portion 27 of the clarified solution is subjected to bleed treatment for impurity and water balance control, as will be described below.

Slurry from the clarifier underflow 28 is filtered and washed (not shown). The filtrate (not shown) may be routed to the neutralization stage 18 as slurry water, with excess returned to the clarifier 24. The solid filter cake is repulped with water and is pumped to a tailing pond 29.

Figure 2:
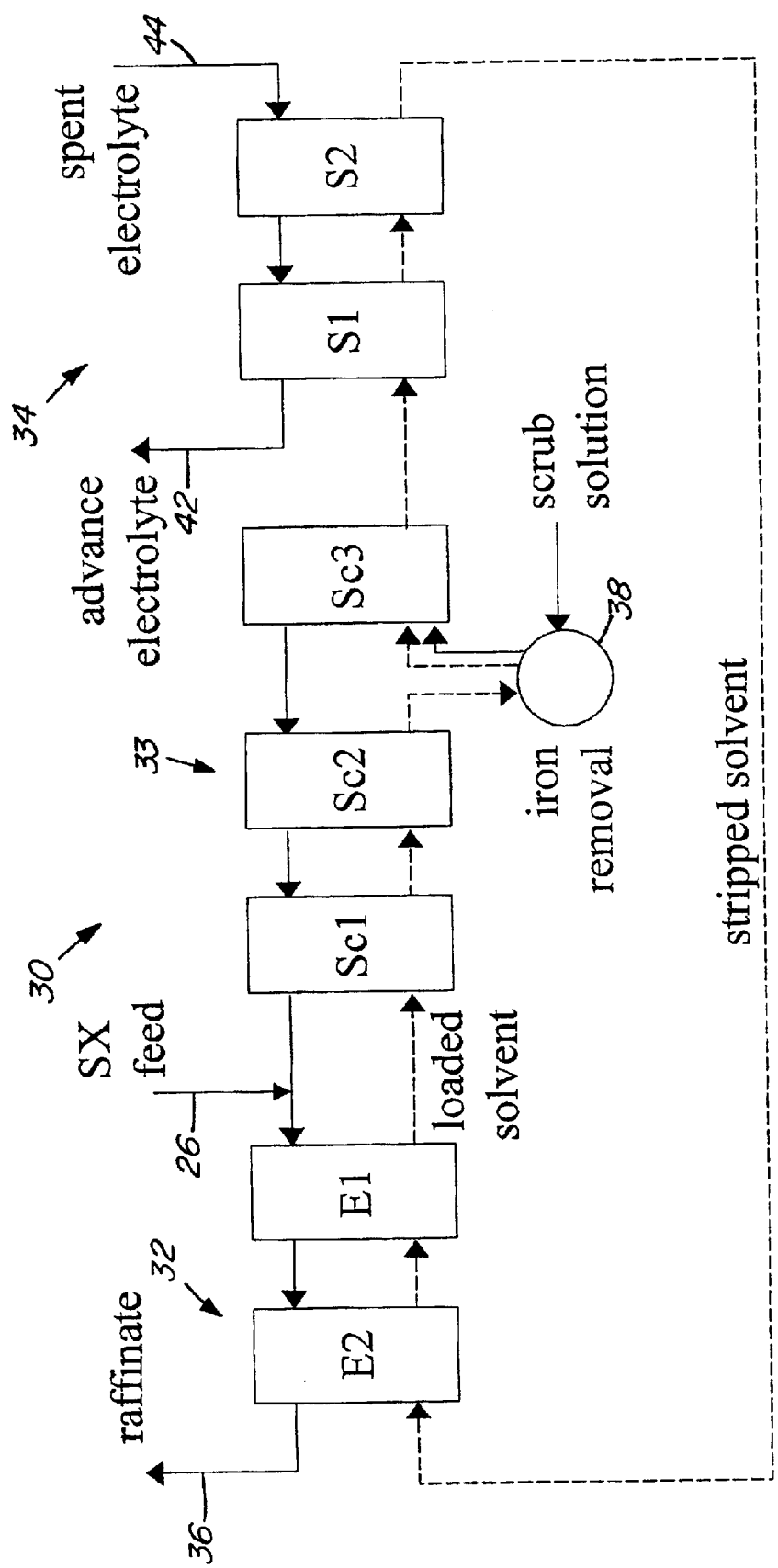
FIG. 2 is a flow diagram of a solvent extraction stage of the process of FIG. 1.

The filtered pregnant solution 26 is sent to zinc solvent extraction stage 30, e.g. typically comprising two extraction stages 32, three scrubbing stages 33 and two stripping stages 34, as shown in FIG. 2. These are examples only. More or less stages can be employed. The configuration may depend on various process parameters.

The two extraction stages 32 each comprises a mixer/settler (labelled as E1 and E2, respectively) and the two stripping stages 34, each comprises a mixer/settler (labelled S1 and S2, respectively). The three scrubbing stages 33 each comprises a mixer/settler (labelled Sc1, Sc2, Sc3 respectively). It is understood that other types of solvent extraction equipment instead of mixer/settlers, may be used, e.g. columns.

Feed solution, being the filtered pregnant solution 26 from the clarifier 24, enters the first mixer/settler E1 where it is contacted with partially loaded organic (for example 20% DEPHA (diethylhexylphosphoric acid) in a diluent, such as Orfom™ SX11 (higher DEPHA concentrations may be used, e.g. 30–40%)) from E2. The partially extracted feed solution from E1 is routed to E2 where it is contacted with barren (stripped) organic from the second stage strip mixer/settler S2. The resulting raffinate from E2 is recycled to the heap 12 (line 36) for use as the acid solution and may be topped up with fresh sulphuric acid of appropriate grade as necessary.

The loaded organic from E1 is sent to the first stage scrub mixer/settler Sc1 where it is contacted with scrub solution from Sc2 to remove any entrained pregnant leach solution in the organic and to scrub co-extracted impurities, such as calcium and cadmium. Various scrub strategies may be envisioned. The Sc1 scrub solution may be sent for example to join with the pregnant leach solution prior to entering E2. The partially scrubbed organic from Sc2 is sent to Sc3 where it is contacted with fresh scrub solution. Ferric iron build-up in the organic may be removed in an iron removal step 38 which comprises reductive stripping using zinc, as described in U.S. Pat. No. 5,228,903, which is incorporated herein by reference.

The scrubbed organic from Sc3 is sent to the first stage strip mixer/settler S1, where it is mixed with partially loaded electrolyte from S2. The resulting zinc-rich solution (advance electrolyte) is sent to the electrowinning stage 40 (line 42) and the partially stripped organic is sent to S2 where it is contacted with lean (spent) electrolyte from the electrowinning stage 40 (line 44). The stripped organic is recycled to the second mixer/settler E2.

During the solvent extraction stage 30 it is not necessary to completely extract the zinc. Partial extraction is preferred since this results in less acid being generated during the solvent extraction stage 30 and simplifies the process, e.g. neutralization is not required. The zinc which is not extracted is not lost, since the raffinate is recycled to the heap 12. Typically, only about 30% to 50% of the zinc is extracted.

The solvent extraction step is represented by reaction (8), "R" denoting a molecule of organic extractant.

$$Zn^{2+} + 2RH \rightleftharpoons 2H^+ + R_2Zn \qquad (8)$$

The advance electrolyte from the solvent extraction 30 may be subjected to three cleaning stages (not shown) prior to the electrowinning stage 40. For example, the first stage may be a coalescer to remove the bulk of any organic present. A dual-media filter can then be used to remove particulate material and more organic. Finally, a carbon column can be used to scavenge any residual organic. The cleaned electrolyte is then sent to the electrowinning stage 40 where the zinc is recovered as cathode metal 46. The resulting spent electrolyte is recycled to the solvent extraction 30.

Conventional zinc electrolysis can be employed and various cell designs are possible from a engineering point of view using aluminum cathodes. In the conventional process, 0.5 to 1.0% silver-lead anodes would be used, but in order to make an acceptable grade zinc product low in lead content, manganese additions would be required, which is undesirable but can be used. In the present process, the solvent extraction 30 does not extract manganese and in the electrowinning stage 40, a no-manganese system is employed wherein 2% silver-lead anodes or bismuth-silver-lead anodes are used. The latter alloy may comprise about 0.7 to 0.8% by weight of silver and about 1.7 to 1.9% by weight of bismuth.

However, if desired, the conventional process in which electrolysis is carried out in the presence of manganese using conventional electrodes, such as 0.5 to 1% silver-lead anodes may be used, in which case manganese would be added to the zinc solution prior to electrolysis.

The electrolysis of the zinc-rich solution is given by reaction (9).

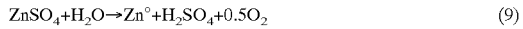
$$ZnSO_4 + H_2O \rightarrow Zn^\circ + H_2SO_4 + 0.5O_2 \qquad (9)$$

The cathodes 46 are stripped and melted in an electric induction furnace and the molten zinc is cast using conventional technology. Because of the purity of the solution produced by the solvent extraction stage 30, the purity of the zinc metal obtained is higher than Special High Grade (SHG) which is an ASTM standard for the highest grade of commercial zinc.

Alternatively, the zinc cathodes can be marketed.

It is understood that electrolysis is not necessarily a limiting step and that, in a variation of the process, any portion of the purified solution can be used to produce zinc compounds, such as zinc carbonate (which can be calcined to produce zinc oxide), zinc hydroxide, zinc oxalate or hydrated zinc sulphate, rather than zinc metal. The purity of the solutions produced by the solvent extraction 30 differs considerably from that produced by conventional processes, offering new opportunities for the direct production of compounds of acceptable grade.

A bleed (e.g. from the pregnant leach solution or raffinate or wash filtrate from neutralization filtration) may be taken from various points in the integrated process 10 to control impurities, such as for example magnesium, calcium, cadmium, manganese, cobalt, chloride and fluoride, and the water balance. For example, as shown in FIG. 1, a bleed is taken from the clarified pregnant leach solution stream (line 27) and pre-heated to at least about 50° C. A first stage 50 of treatment removes cadmium by cementation with zinc dust. The circuit typically includes a number of agitated cadmium precipitation tanks 52 in series (only one being shown), with a total retention time of approximately 20 minutes. Zinc dust is added to the first tank 52. Hydrogen generated during the reaction is vented from the tanks 52. The slurry 55 from the last tank 52 in the series is pressure filtered, as shown at 54. Filtration is effected by means of filters 56 to produce a Cd/Zn filter cake 57 which is collected for further processing. Filtrate 59 passes through the filters 56 and on to the next stage 58 of treatment.

The next treatment stage 58 involves basic zinc sulphate precipitation using lime or limestone. The circuit includes a number of agitated reactor tanks 62 in series (only one being shown), with a typical total retention time of approximately 2 to 6 hours. Lime slurry is added to one or more of the tanks 62, raising the pH to about 6.0. The slurry 63 from the last precipitation reactor tank 62 in the series is discharged to a thickener 64 where flocculant is added. The thickener underflow slurry is sent to the neutralization stage 18 to recover contained zinc (line 22).

Figure 3:
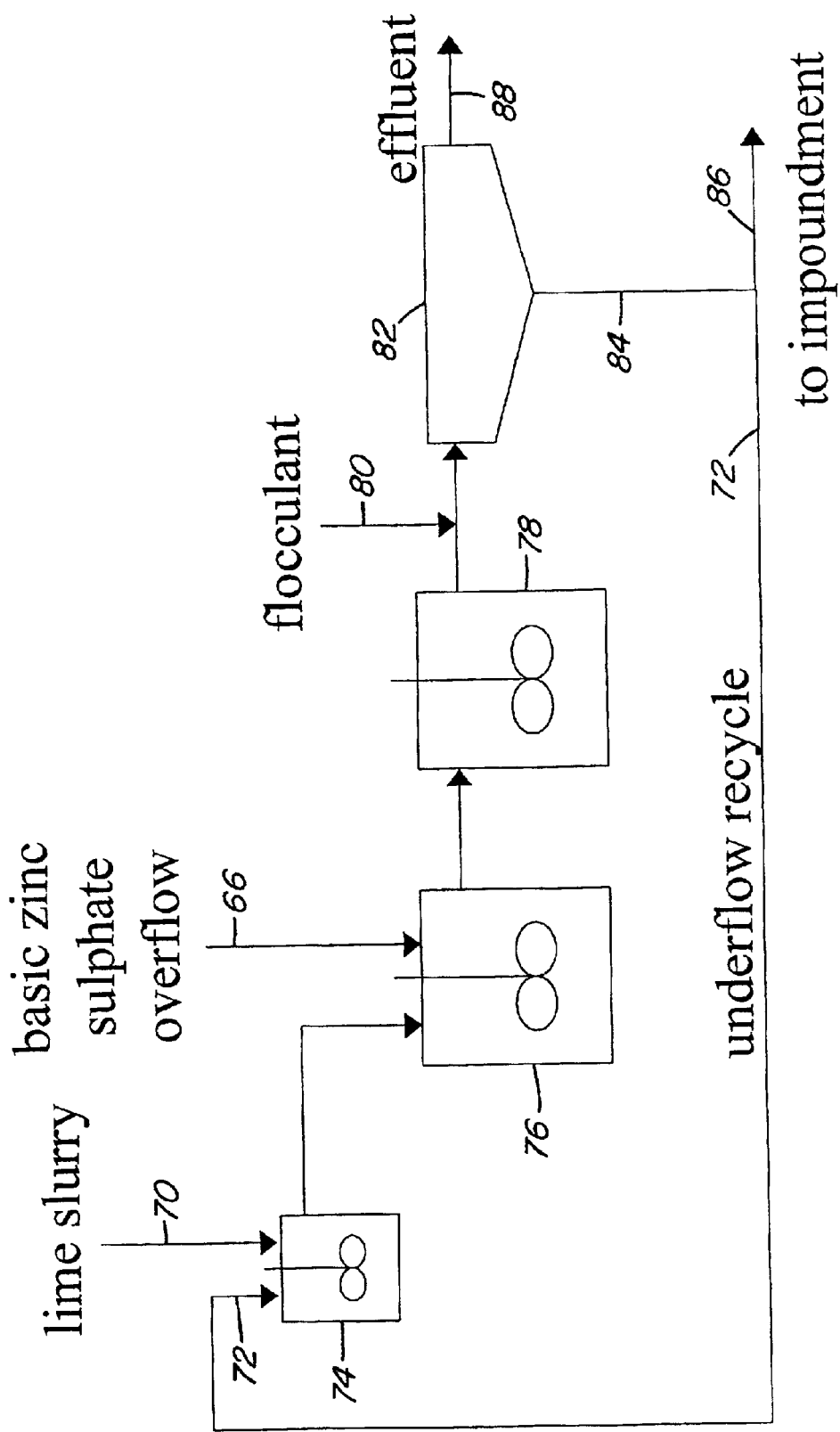
FIG. 3 is a flow diagram showing the treatment of a water bleed from the process.

The overflow 66 from the basic zinc sulphate thickener 64 is given a final treatment to precipitate heavy metals by raising the solution pH to 10 using lime slurry. Agitated tanks in series are used with a total retention time of typically less than 60 minutes. For example, with reference to FIG. 3, lime slurry 70 and recycled sludge 72, which acts as a seed for precipitation, are added to a premix tank 74 which overflows to a reaction tank 76 to which the overflow 66 from the basic zinc sulphate thickener 64 is added. A second reaction tank 78 is typically in series for more complete reaction prior to flocculent addition 80 and discharge to a thickener 82. A portion 72 of the thickener underflow 84 is recycled as described above and the remainder 86 is impounded. The thickener overflow 88 is the treated effluent from the process.

Figure 4:
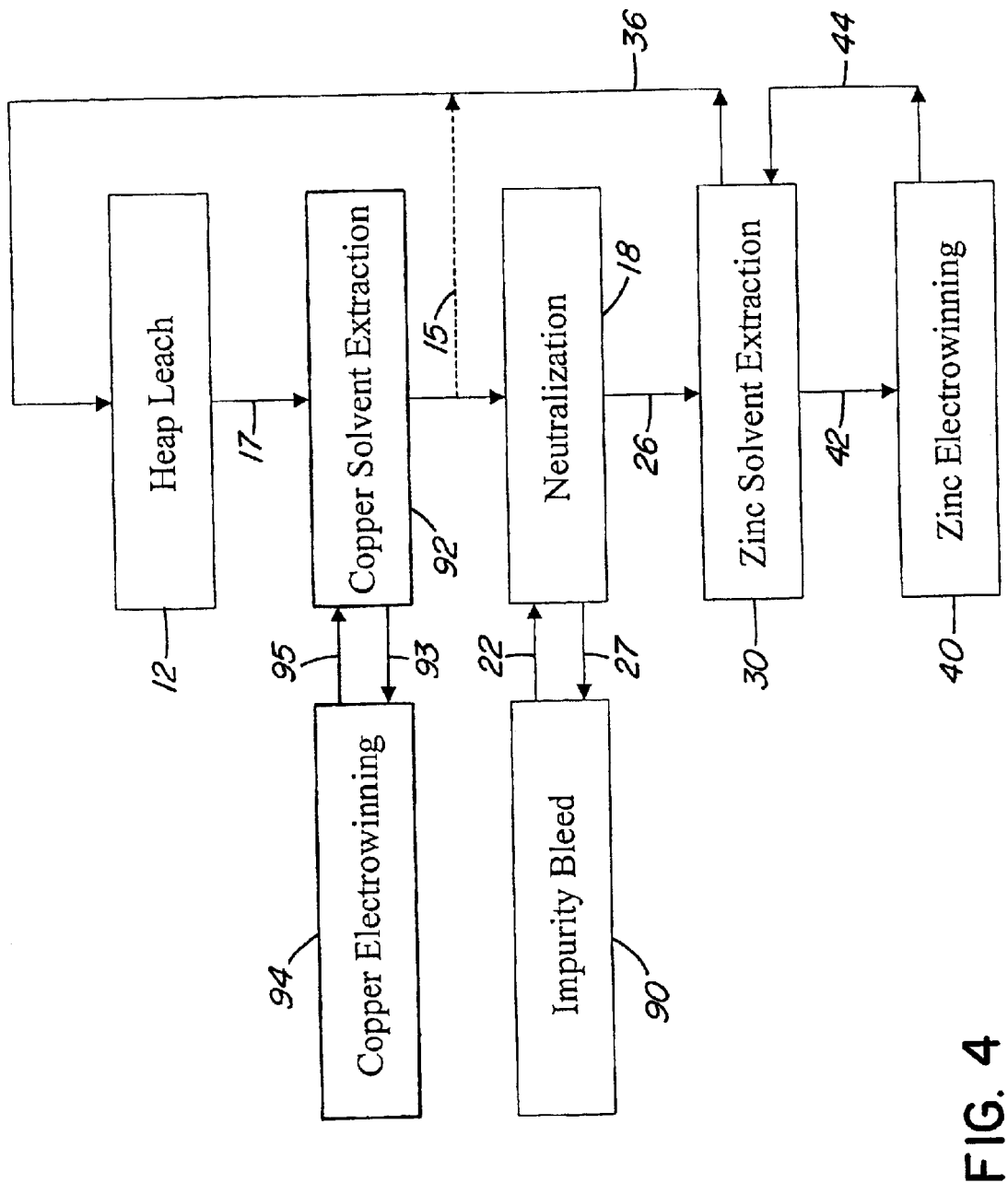
FIG. 4 is a simplified flow diagram showing an application of the process to a zinc-copper ore.

With reference to FIG. 4, the application of the process 10 to a zinc-copper ore is shown. Process steps which correspond with those in FIG. 1 are given like reference numerals, except that the bleed treatment is generally indicated by reference numeral 90 in this simplified flow diagram.

As shown, the pregnant leach solution from the heap 12 is first subjected to a copper solvent extraction 92 with a suitable copper extractant, such as LIX® 984 or Acorga™ M5640, and the raffinate from the copper solvent extraction is subjected to the neutralization 18. However, as indicated by the broken line 15, part of the raffinate may optionally by recycled to the heap 12. The copper solvent extraction 92 produces a concentrated copper solution 93 which is subjected to electrowinning 94 to produce copper metal. Spent electrolyte 95 from the electrowinning 94 is recycled to the solvent extraction 92.

After the neutralization 18, the solution 26 is subjected to zinc solvent extraction 30 and electrowinning as in the case of FIG. 1.

The process is now further illustrated by the following non-limiting examples:

EXAMPLES

Various bioleaching experiments have been carried out in pilot column tests and small zinc cathodes have been made following neutralization and SX/EW. Work has also been carried out in a pilot plant with a nominal capacity of 1 t/d of cathode zinc. The pilot plant treated approximately 4000 tonnes of zinc sulphide ore from Cominco's Red Dog district in Alaska.

All column experiments were carried out at ambient temperature. The PLS (pregnant leach solution) from the columns was neutralized and passed through a solvent extraction mini-plant to extract the zinc. The resulting raffinate solution from this solvent extraction step was then used as feed for the columns as an integrated system. Column diameters were 10 cm, 15 cm, 20 cm and 30 cm, depending on the maximum size of the ore. Column heights were 1 m or 6 m. In some experiments, several 1-m columns were operated in series to simulate a taller, segmented column. In all experiments, the ore was crushed, screened, and agglomerated with acidic solution (typically raffinate). The columns were aerated from the bottom and irrigated with acidic raffinate solution from the top. The columns were not inoculated per se, relying instead on bacteria from other mature columns via the common solvent extraction circuit or relying on bacteria indigenous to the ore. Nutrient needs of the bacteria were adjusted as required.

The graphs in the following examples show an average base rate for zinc extraction of 2.5 kg/m$^2$·d (i.e. an average of 2.5 kilograms of zinc extracted per square meter of heap area in plan view, per day). This value, based on various process and economic considerations, is a useful yardstick for comparison purposes and assists in demonstrating the feasibility of the process.

Example 1

This example demonstrates that various grades of zinc ores are treatable by the process and encouraging zinc extraction rates are achievable.

Figure 5:
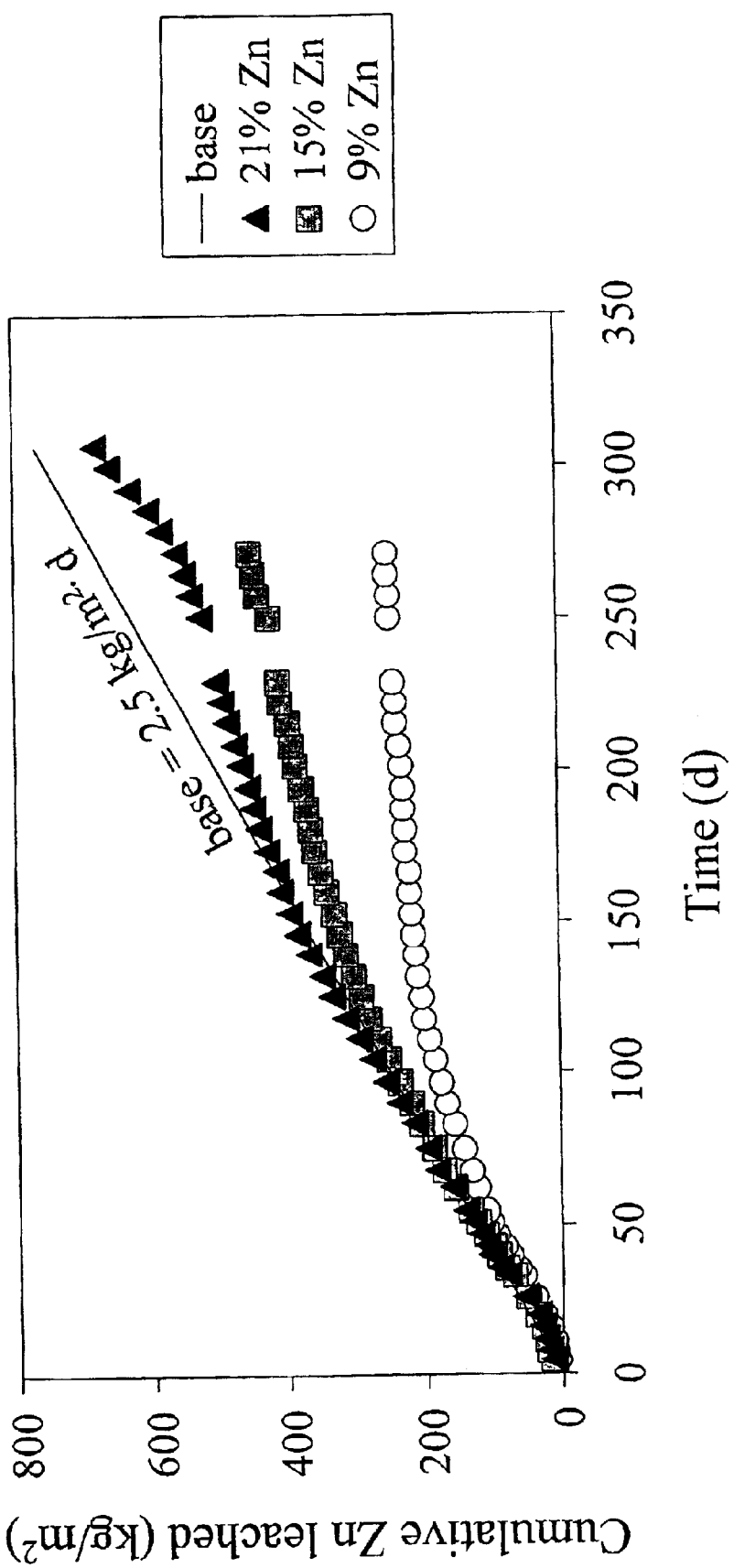
FIG. 5 is a graph showing the effect of ore grade on the amount of zinc leached from the ore.

The graph in FIG. 5 shows the results from an experiment where three different grades of an ore were tested. All three ore samples had a maximum particle size of −12.7 mm.

This preliminary test encouraged further development of the process. All of the ores showed good extraction rates in the earlier stages of the leach. Although more zinc was recovered from the higher grade ores, further process development could result in higher leaching rates for all ores that would meet an extraction rate of 2.5 kg/m$^2$·d. This example clearly demonstrates the applicability of the process to ores of different grades. The process is not restricted to any particular ore grade. It is conceivable that very low grade ores (below 5%) could be treated by the process at appropriate conditions, such application being dependent on economics. Such material could be treated in heaps, dumps, vats and in situ, for example.

Example 2

This example demonstrates that some ores are more amenable to bioleaching than other ores.

Bench scale amenability testing was carried out using ore samples of varying grades for a number of deposits. Amenability testing uses finely ground samples of whole ore in stirred reactors in a fixed pH environment, inoculated with a mesophile bacteria culture. The leaching test is run for 21 days at ambient temperature.

Because the ore is finely ground, leaching rates are high when compared to agglomerated crushed ore, as expected. Leaching rates, using normalized units to account for variations in particle size, vary according to the mineralogy of the ores and leaching results are observed to depend on ore type as shown in Table 1.

TABLE 1

Variability of leaching rates for different deposit types.

| | Number tested | Relative leaching rates | | |
|---|---|---|---|---|
| | | High | Low | Average |
| CRD | 3 | 2.8 | 0.63 | 1.0 |
| VMS | 2 | 2.4 | 1.9 | 2.1 |
| Sedex | 14 | 12 | 3.2 | 6.5 |

CRD = carbonate replacement deposits
VMS = volcanogenic massive sulphide deposits
Sedex = sedimentary exhalative deposits The results above indicate that Sedex (sedimentary exhalative) type deposits give favourable leaching rates, followed by VMS (volcanogenic massive sulphide) type deposits, compared to carbonate replacement type deposits. The importance of deposit selection in applying the bioleaching process is indicated.

Example 3

This example demonstrates that ore sizing is an important parameter for acceptable zinc leaching rates.

Figure 6:
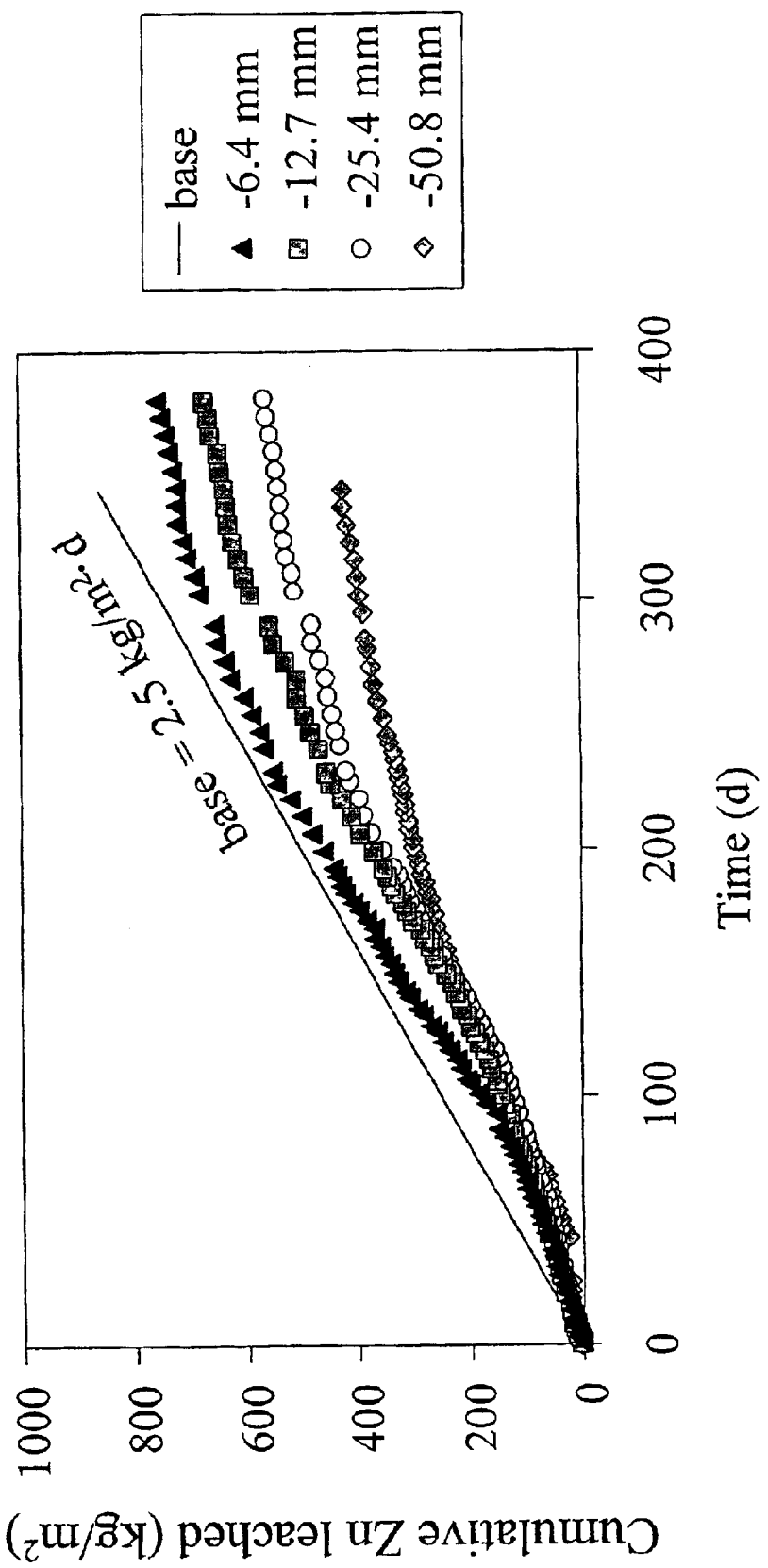
FIG. 6 is a graph showing the effect of ore size on the amount of zinc leached from the ore.

The graph in FIG. 6 shows the results from an experiment where ore from the Red Dog district in Alaska was crushed and screened to four different maximum sizes and tested. Each ore size was agglomerated. The ore grade was 15% zinc and the distribution of sizes was from −6.4 mm to −50.8 mm.

The results clearly indicate generally acceptable leaching rates for all ore sizes tested. The results show how crush size of the ore begins affecting the leaching rate at a sizing of 12.7 mm. A maximum size of about 12 mm would be desirable; however, the process remains feasible up to 25 mm and possibly even up to 50 mm under the correct conditions.

Example 4

This example demonstrates that the process can accommodate ore heaps of various heights, giving attractive zinc extraction rates.

Figure 7:
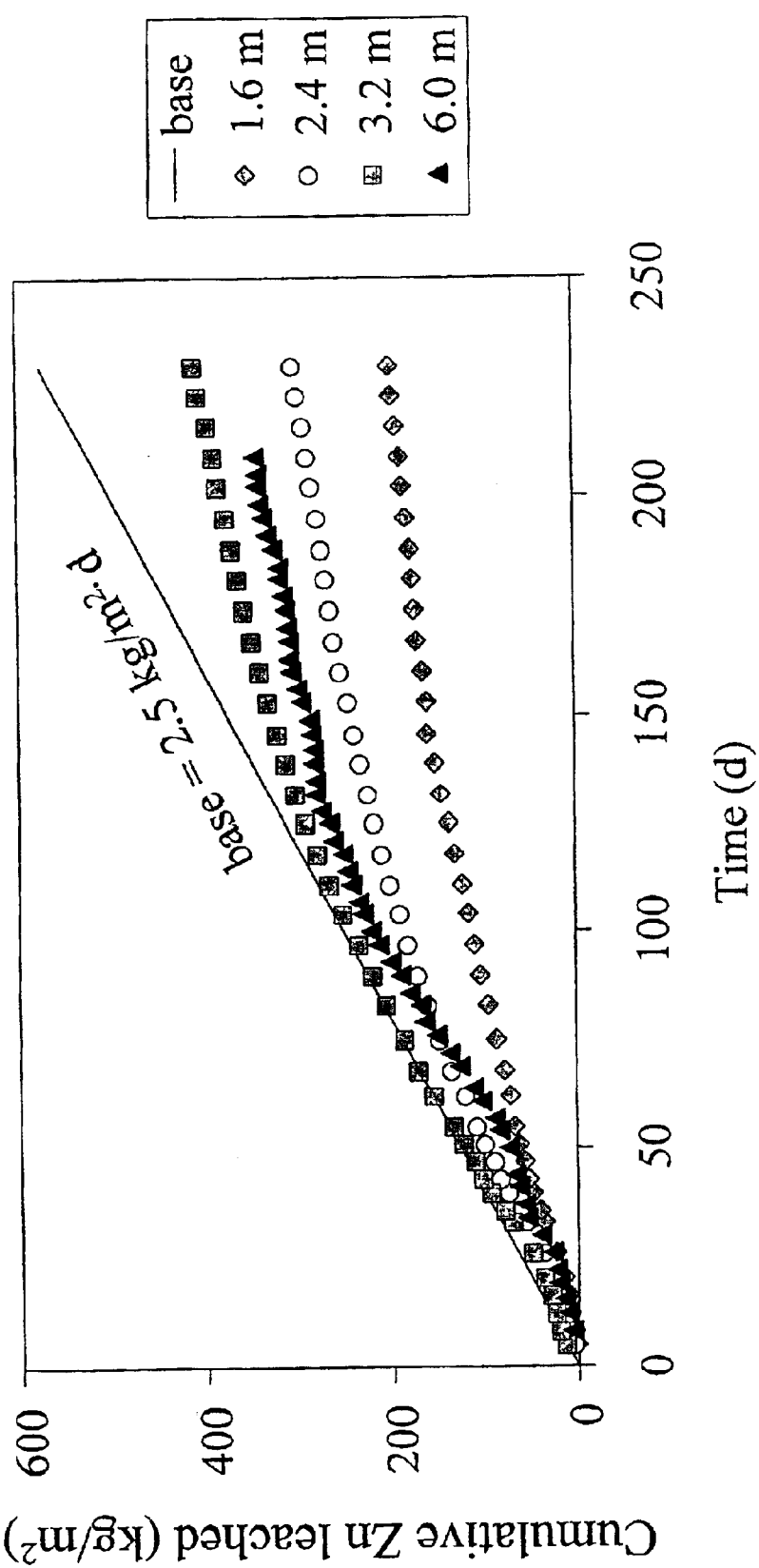
FIG. 7 is a graph showing the effect of column height on the amount of zinc leached from an ore.

The graph in FIG. 7 shows the results from four columns with different heights (1.6 m, 2.4 m, 3.2 m and 6.0 m). All columns were filled with ore from the Red Dog district in Alaska. The ore contained 15% zinc and had a maximum size of −12.7 mm.

The results indicate good zinc extraction rates particularly for columns more than about 3 meters in height. The results also show that the extraction rates are quite similar for column heights more than about 3 meters and that lower extraction rates would be expected for heap heights less than about 3 meters. Thus, the process is not constrained by heap heights above about 3 meters.

Example 5

This example demonstrates the effect of aeration rate on zinc extraction rate.

Figure 8:
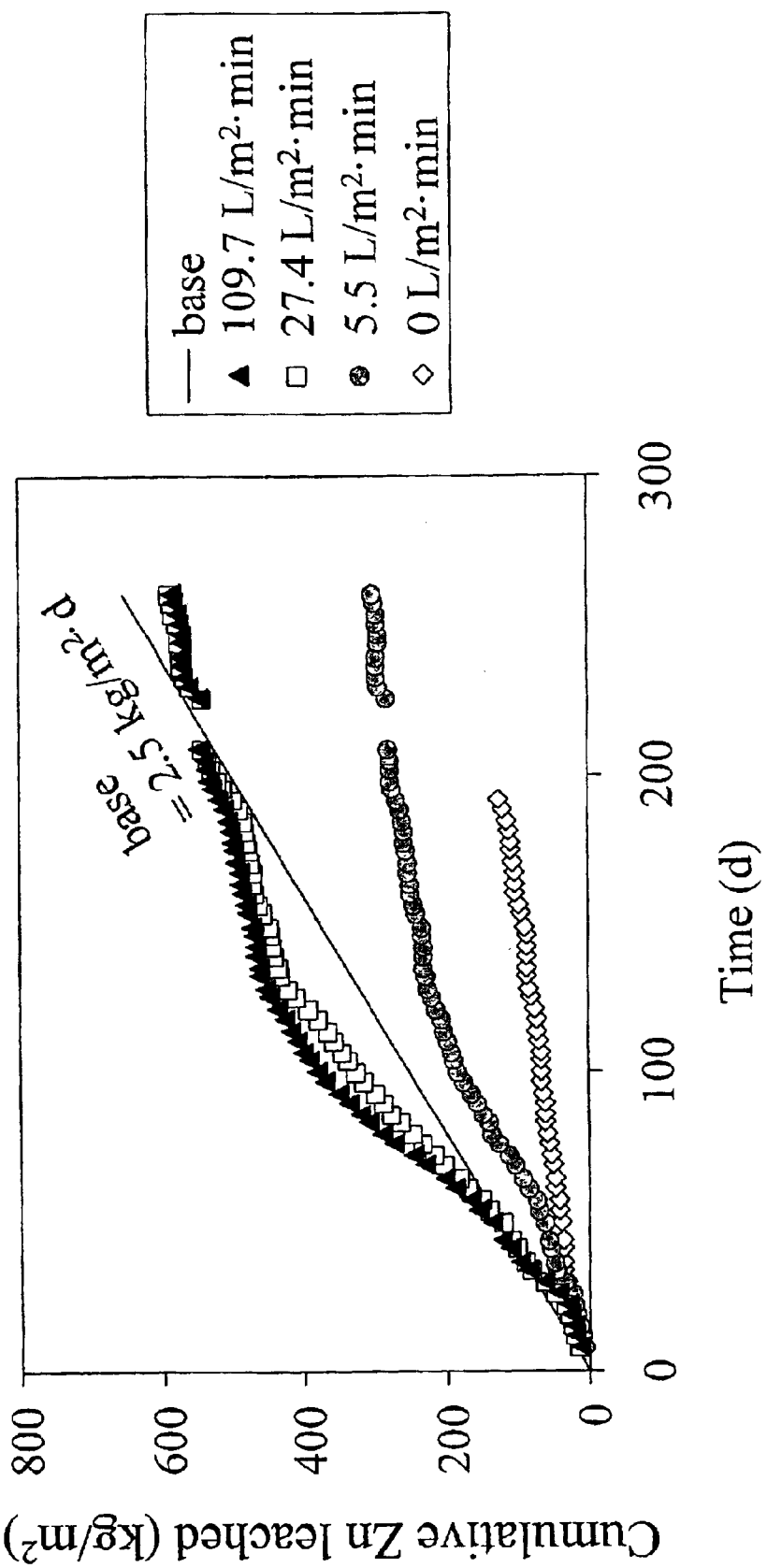
FIG. 8 is a graph showing the effect of aeration rate on the amount of zinc leached from an ore.

The graph in FIG. 8 shows the results from four columns, each aerated at different rates. All columns were filled with ore from the Red Dog district in Alaska. This ore contained 15% zinc and had a maximum size of −12.7 mm.

The results indicate good leaching rates at aeration rates above about 5 L/m$^2$·min.

Example 6

This example demonstrates the effect of the irrigation rate of acidic solution to the top of the heap.

Because a zinc extraction of about 2.5 kg/m$^2$·d is desired and a heap height above 3 meters is not a significant parameter as shown in an earlier example, zinc dissolution from the heap is essentially related to the acidity of the irrigating solution. (This is a simplification of the process that ignores acid generation in the heap.) The acidity of the irrigating solution, in turn, is governed by the solvent extraction circuit and the tolerance of the bacteria for acidity. The solvent extraction process follows the basic chemical reaction below, where "R" denotes a molecule of organic extractant:

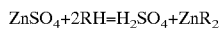

$$ZnSO_4 + 2RH = H_2SO_4 + ZnR_2$$

The acidity generated in the raffinate follows a mass exchange of 1.5 kg of sulphuric acid produced for each 1.0 kg of zinc extracted in solvent extraction. Because this invention covers an integrated process that is in balance, the amount of zinc recovered by solvent extraction is the same as the amount of zinc leached. Conversely, the amount of acid generated by solvent extraction is the same as the amount of acid consumed by the heap. A leaching rate of 2.5 kg/m$^2$·d of zinc, therefore, will return 3.75 kg/m$^2$·d of acid to the heap. In terms of concentrations, for example, a 10 g/L zinc exchange from the aqueous feed in the solvent extraction circuit results in 15 g/L sulphuric acid generated. (A 20 g/L zinc exchange results in 30 g/L sulphuric acid generated.) Irrigation of the heap with raffinate having an acid concentration of 15 g/L and applied at a rate of 3.75 kg/m$^2$·d mathematically predicates an irrigation rate of 0.17 L/m$^2$·min.

Example 7

This example demonstrates the effect of acidity on zinc leaching. It is understood by those skilled in the art that bacteria have a limited tolerance to high concentrations of acid.

Figure 9:
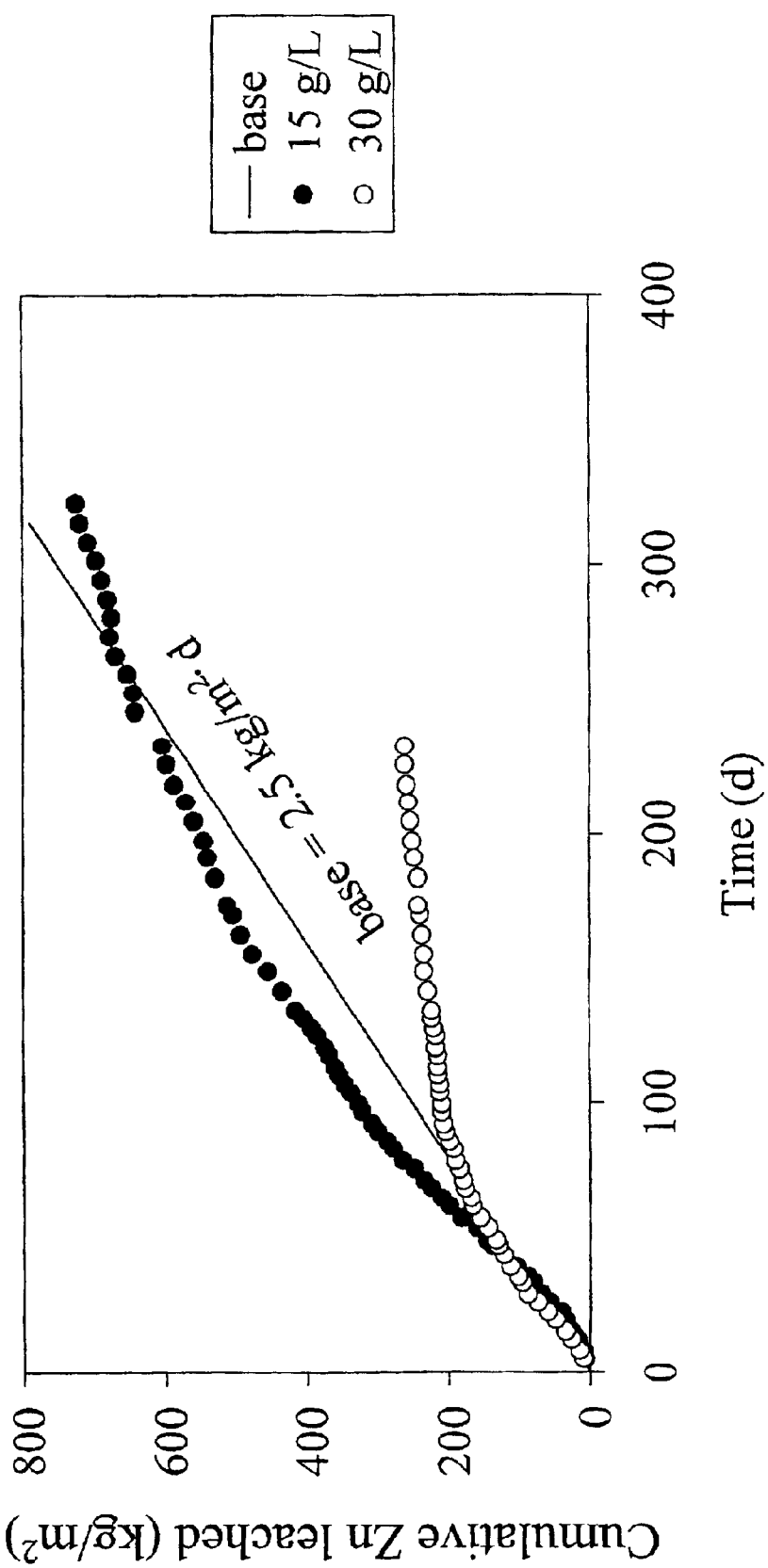
FIG. 9 is a graph showing the effect of acid concentration on the amount of zinc leached from an ore.

The graph in FIG. 9 shows the results from two columns, one receiving twice the sulphuric acid concentration in the irrigating solution as the other. Both columns were filled with ore from the Red Dog district in Alaska. This ore contained 15% zinc and had a maximum size of −12.7 mm. The tests were undertaken at ambient temperatures with mesophiles.

The results show that at an acid concentration of 15 g/L, good zinc extraction rates are achievable at ambient temperatures. Above 15 g/L and less than about 30 g/L, acceptable zinc extraction rates could be attainable under more preferred conditions, such as higher temperatures with different bacteria species. Irrigating the top of a heap with an acidic solution containing less than about 30 g/L sulphuric acid is feasible.

Figure 10:
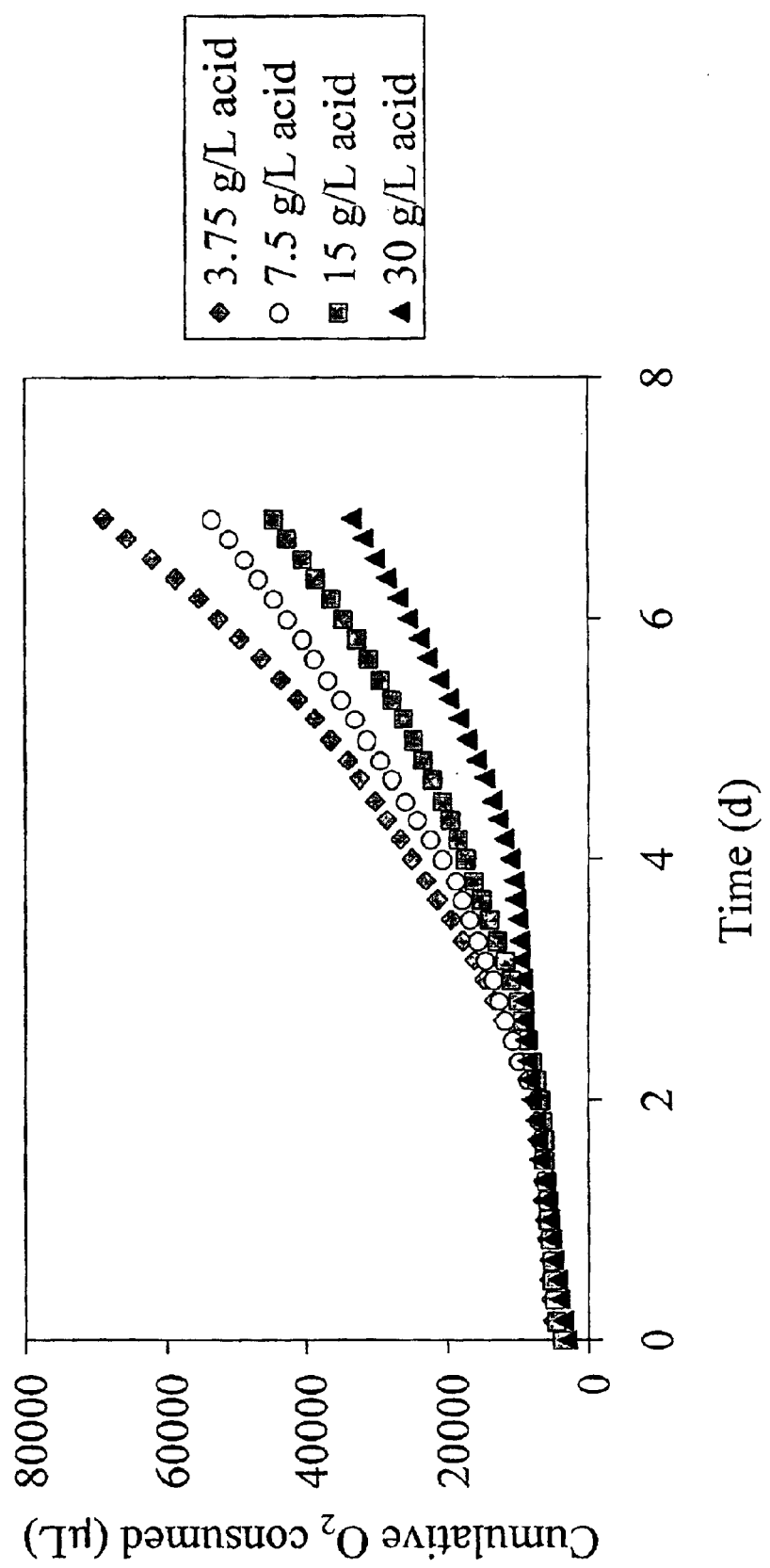
FIG. 10 is a graph showing the effect of free acid on bio-oxidation activity at ambient temperature.

Further to the above, the graph in FIG. 10 shows an acid toxicity test on bioleaching bacteria consortium similar to that used in other examples. The test was undertaken at ambient temperature. Various reaction mixtures containing finely ground ore from the Red Dog district, a bacterial inoculum, and sulphuric acid at various final concentrations were tested using a respirometer method known to those skilled in the art. In this method, the amount of oxygen consumed by the bacteria is a measure of the biological activity of the bacteria present. Bio-oxidation of the ore suspension was monitored by measurement of the oxygen consumption in the reaction mixture.

These results show that acidic solutions containing up to 30 g/L sulphuric acid are not detrimental to the mesophilic bacteria. The heap bioleaching process should function at such acid concentrations. This result compares well with the previous result. Thus, irrigating the top of the heap with an acidic solution containing up to about 30 g/l sulphuric acid is feasible.

Another respirometer test, similar to the one above was undertaken with thermophilic bacteria at 49.5° C. A trend similar to that of FIG. 10 was observed but with slightly higher oxygen consumption levels. Such variations would be expected with different bacterial species. The results for this test also indicate that acidic solutions containing up to 30 g/L sulphuric acid are not detrimental to the thermophilic bacteria.

Example 8

This example demonstrates the effect of recycling pregnant leach solution (PLS) to the top of the heap.

Figure 11:
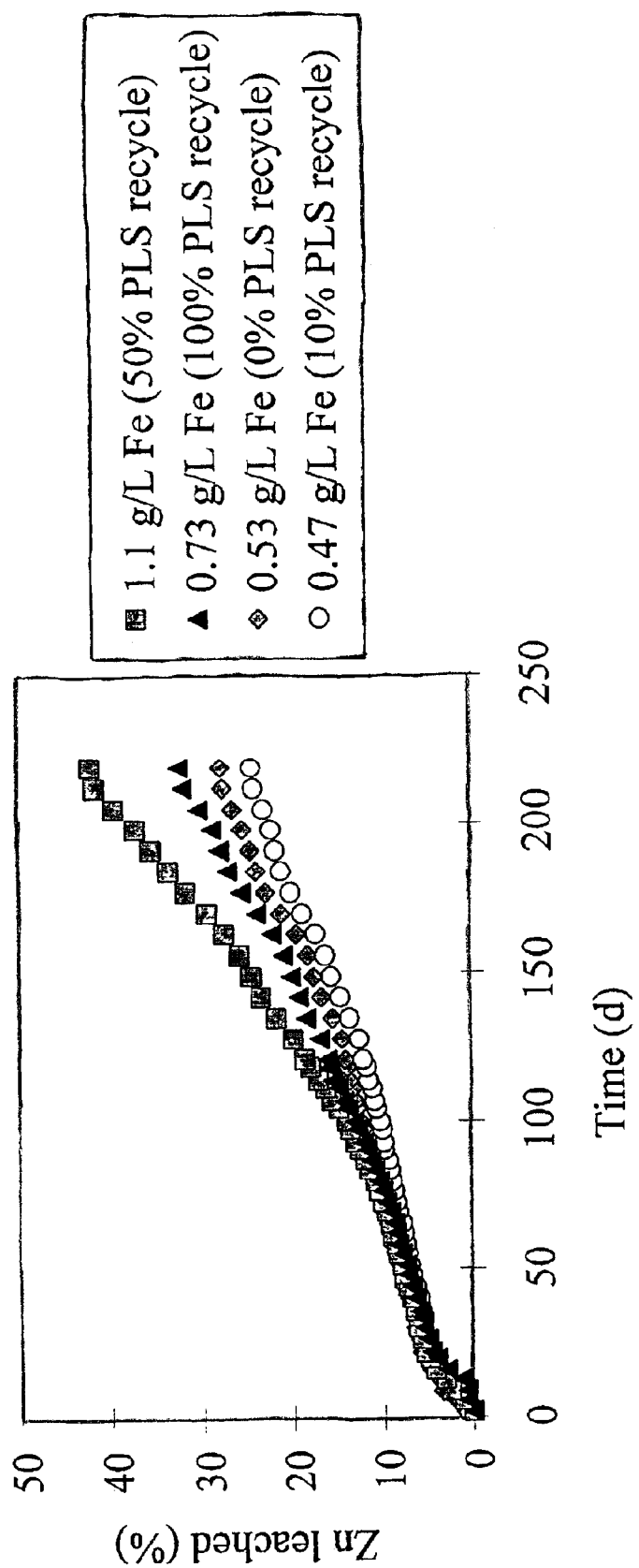
FIG. 11 is a graph showing the effect of pregnant leach solution recycle and iron concentration on zinc leached.

Four continuous column leach tests were undertaken with ore from the Red Dog district that was crushed to a maximum size of −12.7 mm and agglomerated. Note that the height of the columns was only 1.8 meters for this test. A portion of the PLS was recycled to the top of the columns in varying proportions along with acidic raffinate from solvent extraction for ore irrigation. The amount of PLS recycled is expressed as a percentage of the PLS going forward to solvent extraction. The graph in FIG. 11 shows the results of the test.

The results show that there is a significant correlation with the total iron concentration of the PLS. Iron in solution assists the leaching process.

Example 9

This example demonstrates the effect of temperature, acid concentration and iron concentration on the bioleaching of zinc ore. Bench scale tests were undertaken using finely ground samples of whole ore in stirred reactors with air sparging. The ore sample used was from Cominco's Red Dog district in Alaska. The tests were run for 5 days. Tests were undertaken at 25° C. and 30° C. using a mesophile bacteria culture, at 50° C. using a thermophile bacteria culture, and at 65° C. using an extreme thermophile bacteria culture. Because the ore is finely ground, leaching rates are high when compared to agglomerated crushed ore, as expected; however, the results are useful for comparative purposes. Rate constants (k) were determined which can be used to compare relative leaching rates as a relative time factor. The results are shown in Table 2.

TABLE 2

Effect of temperature, acid concentration and iron concentration.

| Relative Time | Rate Constant k (hrs$^{-1}$) | Temperature °C. | Free Acid pH | Iron Addition g/L |
|---|---|---|---|---|
| 1 | 0.00305 | 25 | pH 2 | — |
| 0.8 | 0.0039 | 50 | pH 2 | 0.04 |
| 0.47 | 0.0065 | 65 | pH 2 | 0.04 |
| 0.43 | 0.0071 | 50 | 15 g/L | 0.04 |
| 0.41 | 0.0074 | 30 | 15 g/L | 2 |
| 0.26 | 0.0118 | 50 | 15 g/L | 2 |
| 0.23 | 0.0130 | 65 | pH 2 | 2 |
| 0.23 | 0.0132 | 65 | 15 g/L | 0.04 |
| 0.23 | 0.0133 | 65 | 30 g/L | 0.2 |
| 0.23 | 0.0134 | 50 | pH 2 | 2 |
| 0.20 | 0.0150 | 65 | 30 g/L | 1 |
| 0.18 | 0.0170 | 65 | 30 g/L | 2 |
| 0.16 | 0.0185 | 65 | 15 g/L | 2 |

The data in the table are in order of decreasing relative time, for which smaller numbers relate to faster leaching rates. The results indicate enhancement of leaching rates with increasing temperature, acid concentration and iron concentration. Although $H_2SO_4$ concentrations above 30 g/L remain untested, it is conceivable that higher acid concentrations could be feasible.

Example 10

The purpose of this example is to demonstrate the neutralization step as part of the integrated process. The PLS that was used was derived from bioleaching ore in test columns. Neutralization was undertaken without forced aeration, leaving ferrous iron in solution.

Table 3 gives data from one of the neutralization runs using a composite PLS from experiments where sulphide ore was being leached. A number of column experiments with different ore grades and different particle sizes were carried out under conditions favourable to sulphide oxidation by bacteria. The columns were aerated from the bottom and irrigated from the top. Irrigating solution was raffinate from a bench-scale SX circuit. Nutrient in the form of ammonium sulphate was added to the raffinate prior to application to the columns. The composite PLS was reacted with limestone in a neutralization circuit consisting of two reactor stages followed by a clarifier for solid-liquid separation. Flocculant was added just upstream of the clarifier. Residence time in each stage was about 30 min.

TABLE 3

Neutralization of PLS

|  |  | 3-week test |
|---|---|---|
| PLS feed |  |  |
| pH | pH | 2.4 |
| Iron (total) | g/L | 1.4 to 1.7 |
| Neutralized PLS |  |  |
| pH | pH | 3.9 to 4.5 |
| Iron (total) | g/L | 0.63 to 0.65 |
| PLS volume treated | L | 550 |
| Limestone added | g | 1,500 |
| Iron precipitated | g | 492 |
| Zinc to SX | g | 14,774 |

Neutralization of the PLS, as part of the integrated process, is demonstrated by the above data. Acid is neutralized in the step and ferric iron is precipitated. Because there is no forced aeration, ferrous iron persists in the neutralized PLS.

Example 11

This example demonstrates the solvent extraction (SX) step using neutralized PLS.

Table 4 gives data from two SX runs using neutralized PLS from experiments where sulphide ore was being leached. A number of column experiments with different ore grades and different particle sizes was carried out and neutralized as described in the previous example. Neutralized PLS was mixed with solution from the organic scrub stage and fed to the SX circuit. The SX circuit consisted of two extraction stages, two stripping stages, and three scrub stages as shown in the flow sheet in FIG. 2. Organic extractant used was DEHPA. Organic carrier was kerosene. Feed throughput and raffinate effluent were 130 mL/min. Electrolyte feed and spent electrolyte were 30 mL/min to 35 mL/min. Make-up acid, consisting of diluted electrolyte solution, was added at the third scrub stage, eventually making its way to the second extraction stage, at a rate of 12 mL/min to 15 mL/min.

TABLE 4

Operation of the SX circuit

|  |  |  |  | Test A (3 days) | Test B (3 days) |
|---|---|---|---|---|---|
| To SX | Neutralized PLS | volume | L | 69.8 | 84.4 |
|  |  | Zn | g/L | 27.9 | 27.0 |
|  |  | Zn | g | 1,947 | 2,279 |
|  | Scrub solution | volume | L | 5.1 | 6.3 |
|  |  | Zn | g/L | 8.2 | 7.0 |
|  |  | Zn | g | 42 | 44 |
| To Column Leach | Raffinate | volume | L | 74.9 | 90.7 |
|  |  | Zn | g/L | 18.1 | 15.0 |
|  |  | Zn | g | 1,356 | 1,361 |
| To EW | Feed electrolyte | volume | L | 16.7 | 21.7 |
|  |  | Zn | g/L | 37.9 | 44.3 |
|  |  | Zn | g | 633 | 962 |
| Zinc concentration difference at SX |  |  | g/L | 9.8 | 12 |
| Portion of zinc to raffinate |  |  | % | 68 | 59 |
| Portion of zinc to EW |  |  | % | 32 | 41 |

Solvent extraction of the neutralized PLS, as part of the integrated process, is demonstrated by the above data. Notable is the simplification of the extraction circuit in that the zinc content of the raffinate need not be reduced to low levels with concentrations of zinc in the raffinate of 15.0 g/L to 18.1 g/L. The concentration of acid generated in SX can be controlled to meet the acidity requirement in the heap.

Example 12

Table 5 compares the purity of some of the zinc cathodes produced from continuous integrated leach/SX/EW tests on a mini pilot plant scale. For comparison, the Special High Grade (SHG) zinc standard is also shown. Cathode quality was well within the impurity levels allowed for SHG zinc. Zinc cathode was obtained from column leaching experiments with a sulphide ore, followed by neutralization of the PLS with limestone, solvent extraction with DEHPA, and electrowinning. For these tests, 0.75% Ag/Pb anodes were used in EW and no manganese was added. Strontium carbonate was added at an excessive rate of 1.7 to 2.4 kg/t cathode zinc in order to control lead.

TABLE 5

Impurities in zinc cathode

| Element | Content | SHG grade | Test 1 (3 days) | Test 2 (3 days) |
|---|---|---|---|---|
| Al | ppm | 20 max | 7 | 9 |
| As | ppm | — | 1 | 1 |
| Cd | ppm | 30 max | 3 | 2 |
| Cu | ppm | 20 max | 2 | 2 |
| Fe | ppm | 30 max | 4 | 2 |
| Pb | ppm | 30 max | 15 | 12 |
| Sn | ppm | 10 max | <1 | <1 |
| Tl | ppm | — | <1 | <1 |
| Total non-zinc | ppm | 100 max | | |

From the results, it can be seen that very high grade zinc, better than the SHG standard, can be produced from the integrated process.

Results of Pilot Plant Tests

The following examples summarize the results of a nominal one t/d cathode zinc pilot plant that treated sulphide zinc ore from Cominco's Red Dog district in Alaska. The test program was undertaken to demonstrate the feasibility of zinc heap leaching and integration with neutralization, solvent extraction and electrowinning on a large scale.

The pilot plant was designed and built according to the unit operations as shown in the flow sheet in FIG. 1. A 4000-tonne ore sample from the Red Dog district was crushed to a maximum size of −12.7 mm and agglomerated with acid mine drainage. This agglomerate was then stacked in a heap measuring 20 m×20 m×6 m tall. The heap was constructed with proper liner containment. Appropriate PLS collection piping, air distribution system and irrigation lines were installed. Temperature sensors and heap oxygen sampling points were installed in order to monitor the heap. A pilot plant building was constructed to house the various reactors, clarifiers, solvent extraction mixer-settlers, electrolysis cells and other required equipment. PLS neutralization was operated without forced aeration. The SX circuit included removal of iron from the organic by reductive stripping using zinc. Zinc electrolysis was carried out in a no-manganese system using 2% silver-lead anodes.

After a two-month commissioning period, the first test commenced based on a heap area of 400 m$^2$. When it was realized that the various unit operations had to be brought into balance with one another, the operational size of the heap was reduced to 200 m$^2$.

Example 13

Table 6 gives key pilot plant operating data for the various unit operations in the integrated process. Two main test runs were carried out. In order to realize all unit operations in balance without restricting the leaching step, only one half of the heap was operated in test 2.

TABLE 6

Pilot plant weekly operating results.

| Pilot Plant - weekly operating results | Unit | Test 1 400 m$^2$ heap 6 weeks duration | | | Test 2 200 m$^2$ heap 10 weeks duration | | |
|---|---|---|---|---|---|---|---|
| | | average | min | max | average | min | max |
| Leach | | | | | | | |
| Solution flow to heap | m$^3$/wk | 657.5 | 639.2 | 671.0 | 373.3 | 218.2 | 512.1 |
| Zn in solution to heap | g/L | 39.2 | 30.5 | 53.5 | 13.7 | 5.0 | 30.8 |
| Acid in solution to heap | g/L | 3.5 | 1.3 | 9.5 | 10.9 | 5.9 | 13.2 |
| Temperature of solution to heap | ° C. | | | | 26.4 | 15.7 | 29.6 |
| Zn in PLS from heap | g/L | 49.1 | 42.4 | 60.2 | 25.6 | 10.5 | 41.0 |
| PLS pH | pH | 2.2 | 1.0 | 3.4 | 2.3 | 1.1 | 3.2 |
| Temperature of PLS from heap | ° C. | 34.9 | 31.1 | 39.2 | 41.4 | 24.2 | 45.8 |
| Zinc concentration difference over heap | g/L | 9.9 | 6.7 | 11.9 | 11.9 | 5.9 | 14.4 |
| Neutralization | | | | | | | |
| Solution flow to neutralization | m$^3$/wk | 528.6 | 364.0 | 716.3 | 561.6 | 339.4 | 666.7 |
| Acid in solution to neutralization | g/L | 4.7 | 1.4 | 8.4 | 5.9 | 2.1 | 7.9 |
| Neutralized solution | pH | 3.9 | 2.9 | 4.4 | 3.6 | 1.9 | 3.9 |
| Limestone Usage | t/wk | 4.4 | 3.5 | 5.6 | 4.6 | 2.7 | 6.5 |
| Impurity Bleed | | | | | | | |
| Solution flow to impurity bleed | m$^3$/wk | 29.7 | 21.3 | 37.6 | 61.6 | 1.9 | 99.4 |
| BZS reaction temperature | ° C. | 79.8 | 72.5 | 83.2 | 77.6 | 40.5 | 83.2 |
| Solution to water treatment pH | pH | 6.0 | 6.0 | 6.0 | 4.4 | 2.3 | 5.5 |
| Zn in solution to water treatment | g/L | 1.1 | 1.1 | 1.1 | 2.1 | 1.2 | 2.8 |
| Solvent Extraction | | | | | | | |
| Solution flow to SX | m$^3$/wk | 461.1 | 363.1 | 636.6 | 487.6 | 229.0 | 593.5 |
| Zn in solution to SX | g/L | 35.1 | 31.4 | 39.0 | 20.8 | 10.0 | 33.3 |
| Zn in raffinate | g/L | 23.4 | 21.6 | 26.7 | 11.8 | 5.1 | 23.3 |
| Zn concentration difference over SX | g/L | 11.6 | 9.8 | 12.7 | 9.1 | 5.2 | 11.1 |

TABLE 6-continued

Pilot plant weekly operating results.

| Pilot Plant - weekly operating results | Unit | Test 1 400 m² heap 6 weeks duration | | | Test 2 200 m² heap 10 weeks duration | | |
|---|---|---|---|---|---|---|---|
| | | average | min | max | average | min | max |
| Zn transferred into organic | t/wk | 5.3 | 3.8 | 7.1 | 4.5 | 1.9 | 5.5 |
| Spent electrolyte to SX strip circuit | m³/wk | 122.8 | 108.3 | 130.7 | 99.2 | 59.0 | 116.7 |
| Zn in advance electrolyte | g/L | 105.1 | 93.8 | 116.7 | 95.4 | 53.7 | 114.7 |
| Zn in spent electrolyte | g/L | 54.2 | 47.4 | 64.5 | 53.1 | 30.6 | 61.8 |
| Zn concentration difference over strip | g/L | 50.3 | 39.3 | 55.8 | 42.5 | 24.9 | 52.9 |
| Zn stripped from organic | t/wk | 4.6 | 3.2 | 5.9 | 4.8 | 2.4 | 6.3 |
| Spent electrolyte to scrub circuit | m³/wk | 9.0 | 4.8 | 19.1 | 10.4 | 4.0 | 38.1 |
| Electrowinning | | | | | | | |
| Zn cathode produced | t/wk | 4.5 | 3.1 | 5.8 | 3.7 | 2.2 | 4.6 |
| Average plating cycle | H | 32.5 | 25.7 | 40.3 | 35.8 | 20.9 | 47.8 |
| Average current density | A/m² | 409.1 | 367.4 | 448.2 | 395.3 | 215.6 | 502.0 |

Above figures are derived from operating weekly averages

The above data clearly demonstrates the fully integrated process. Considerable experience was gained by operating a large-scale heap for the biooxidation of zinc ore, which, to our knowledge, is an industry first. Contrary to the literature, problems related to decrepitation and iron precipitation in the heap were avoided. Microscopic examination of leached ore samples indicates that the bacteria attack the zinc mineral in the ore leaving a lattice that is a factor in overcoming permeability problems. Acidity levels in the heap overcome iron precipitation problems.

It was also demonstrated that in a large-scale heap, which does not suffer from the relatively large heat losses associated with experimental column leaching, the heat of reaction results in significant autogenous heating of the heap. The resulting temperatures allow various bacterial species to persist and grow, particularly under more thermophilic conditions that are desired for higher zinc extraction rates.

The increase in zinc concentration across the heap closely corresponds with a decrease in zinc concentration across SX in an elegant, balanced integrated operation. It is not necessary to have a high zinc recovery in SX equating to low levels in the raffinate (i.e. zinc levels in raffinate ranged from 5.1 to 26.7 g/L). The zinc is not lost and simply circulates in the system. By operating in this manner, the SX of zinc is simplified, eliminating any need for inter-stage neutralization in SX.

SX in the presence of ferrous iron, because of no forced aeration in the PLS neutralization step, was successfully demonstrated with the inclusion of an organic iron removal step in the SX circuit. The contained iron in raffinate, which is used to irrigate the heap, is beneficial to the leaching process.

Zinc electrolysis in a no-manganese system was also demonstrated on a larger scale using 2% silver-lead anodes. A stabilization period of operation is typically required for any new zinc electrowinning operation during which time elevated lead levels in cathode zinc decrease. After such stabilization, lead in cathode averaged 22 ppm over a selected 2-week period.

Example 14

Figure 12:
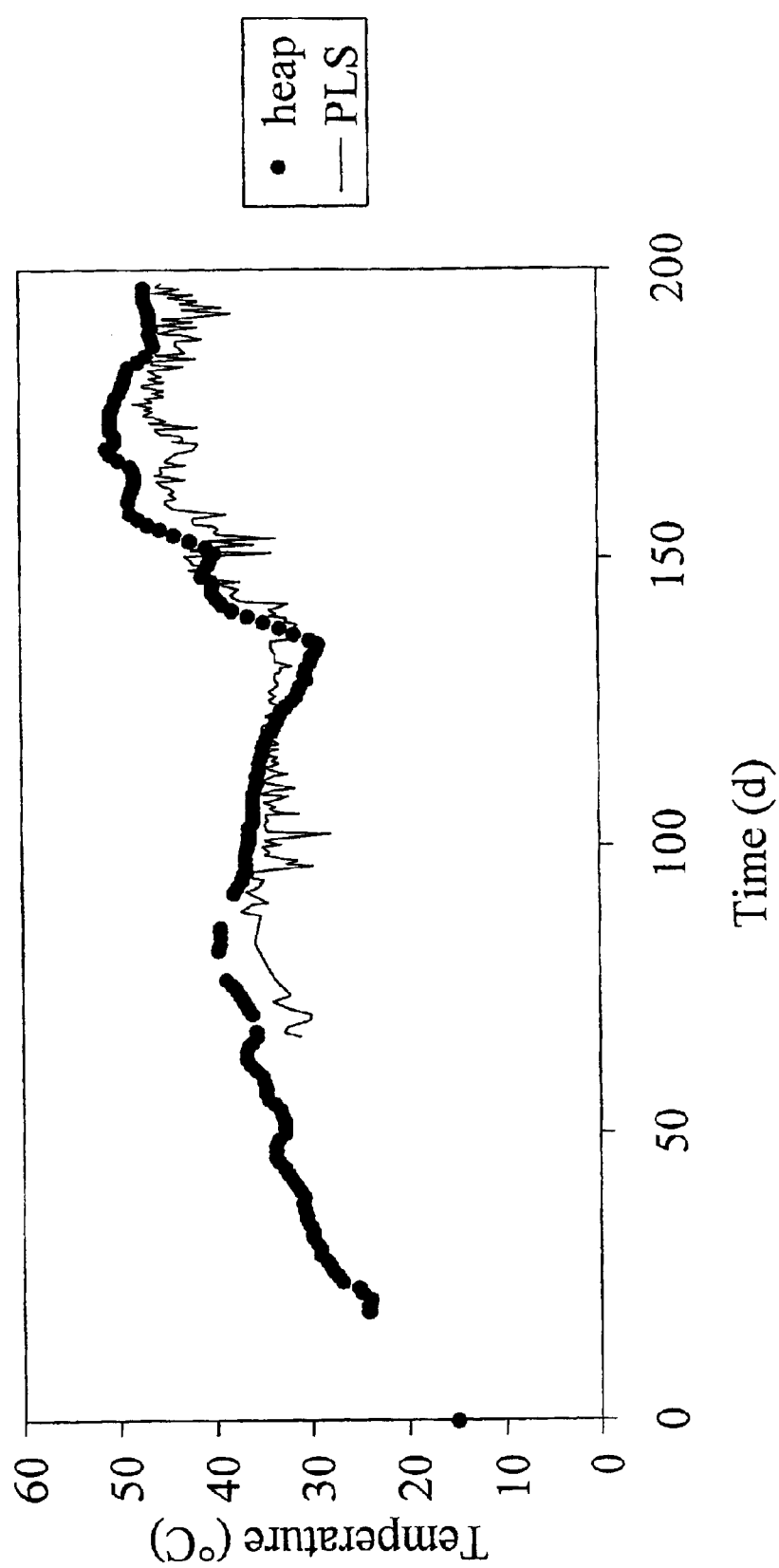
FIG. 12 is a graph showing the correlation between average heap and pregnant leach solution temperatures.

This example demonstrates that the PLS temperature measured at the bottom of the heap closely follows the average of the temperatures measured in the heap. The entire 400-m² heap had 42 temperature sensors distributed over the area and at three different depths. The graph in FIG. 12 shows the close relationship between the average of the temperatures measured in the heap and the temperature of the PLS. This is useful for determining heap temperature relationships.

Example 15

Figure 13:
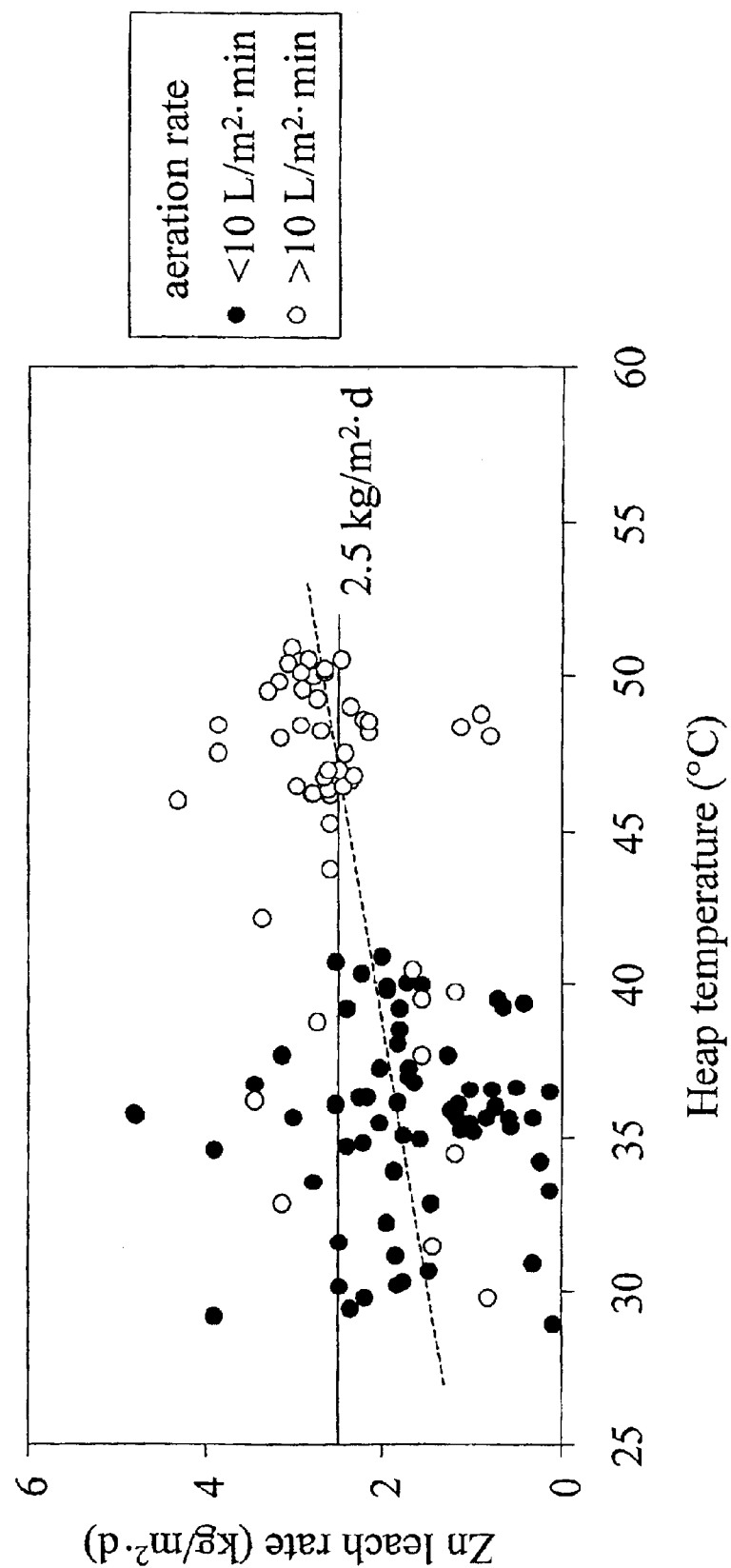
FIG. 13 is a graph showing the correlation between zinc extraction rate and heap temperature.

This example demonstrates the effect of heap temperature on the rate of zinc extraction from the heap. The calculated rates were based on pilot plant operating data collected every 12-hour shift. The graph in FIG. 13 clearly shows higher zinc extractions at higher temperatures that also correspond to heap aeration rates above 10 L/m²·min. The dotted line is the correlation fitted by computer software.

Example 16

Figure 14:
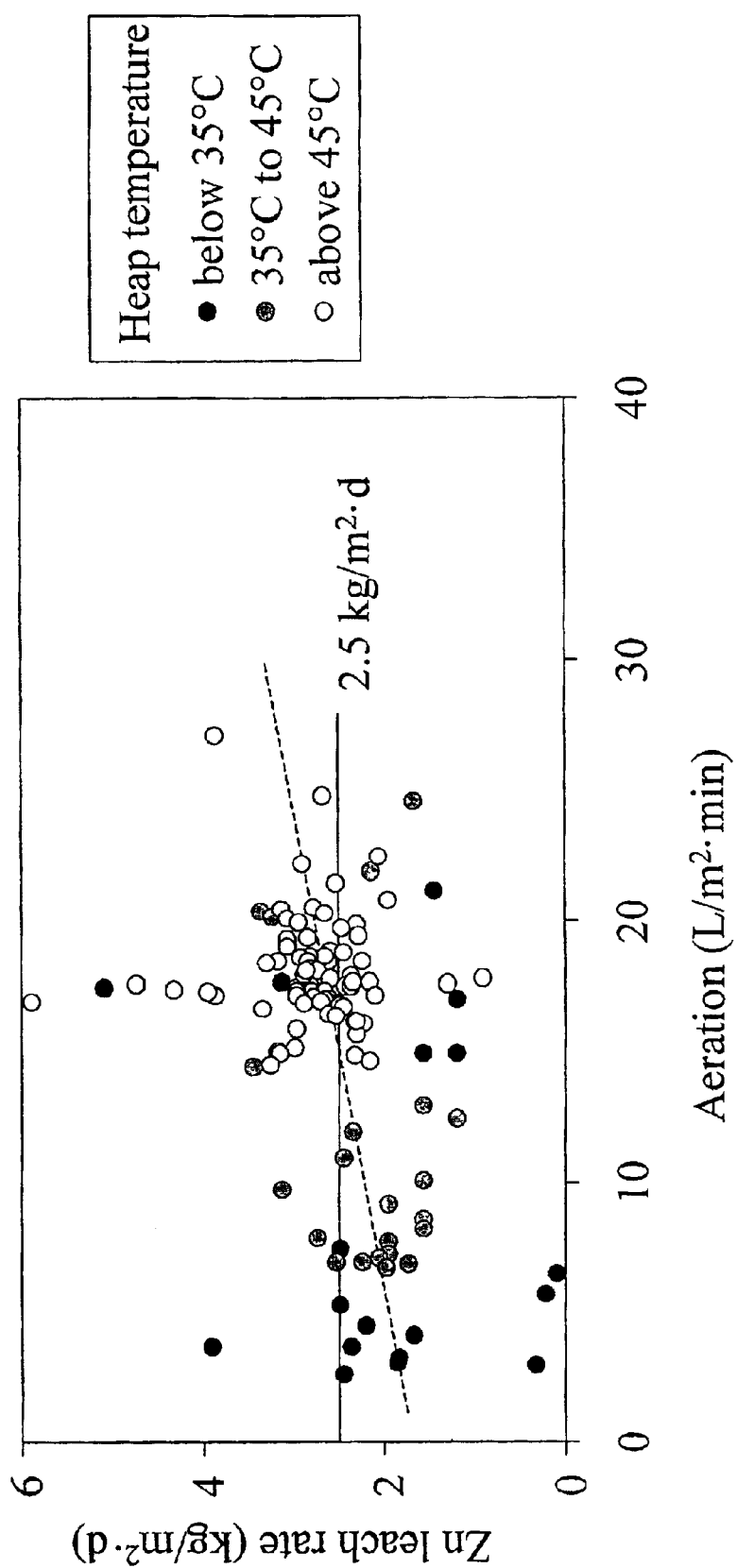
FIG. 14 is a graph showing the correlation between zinc extraction rate and aeration of the heap.

This example demonstrates the effect of aeration rate on the rate of zinc extraction from the heap. The calculated rates were based on pilot plant operating data collected every 12-hour shift. The graph in FIG. 14 shows higher zinc extraction at higher rates of aeration. The dotted line is the correlation fitted by computer software. In addition, the graph shows a correlation of higher rates at higher temperatures.

Figure 15:
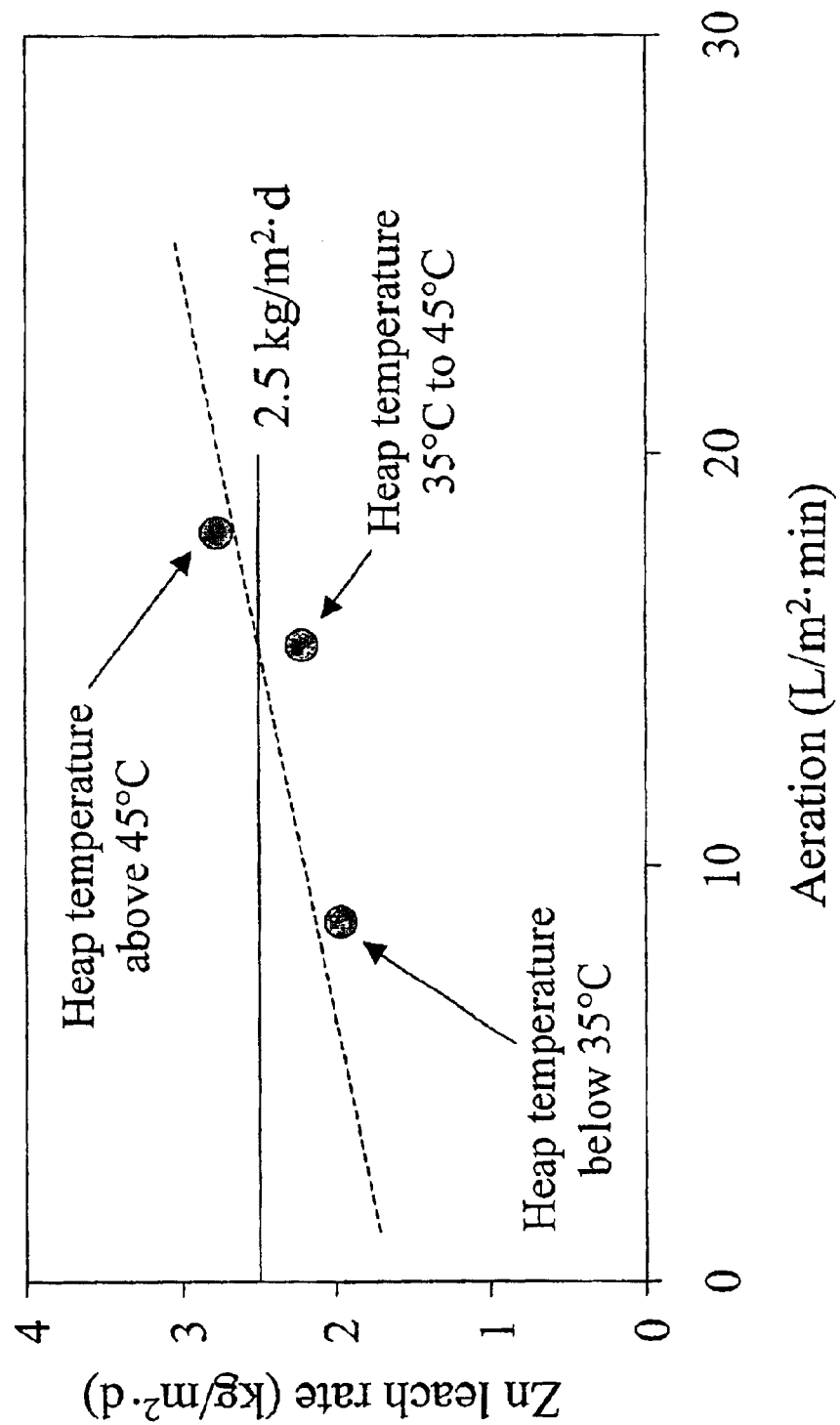
FIG. 15 is a graph showing the correlation between average zinc extraction rate and average aeration.

Averages of the data in the previous figure were used to construct the graph in FIG. 15. The graph more clearly shows higher zinc extraction rates correlating with higher aeration rates and higher temperatures. The dotted line is the correlation fitted by computer software.

Example 17

Figure 16:
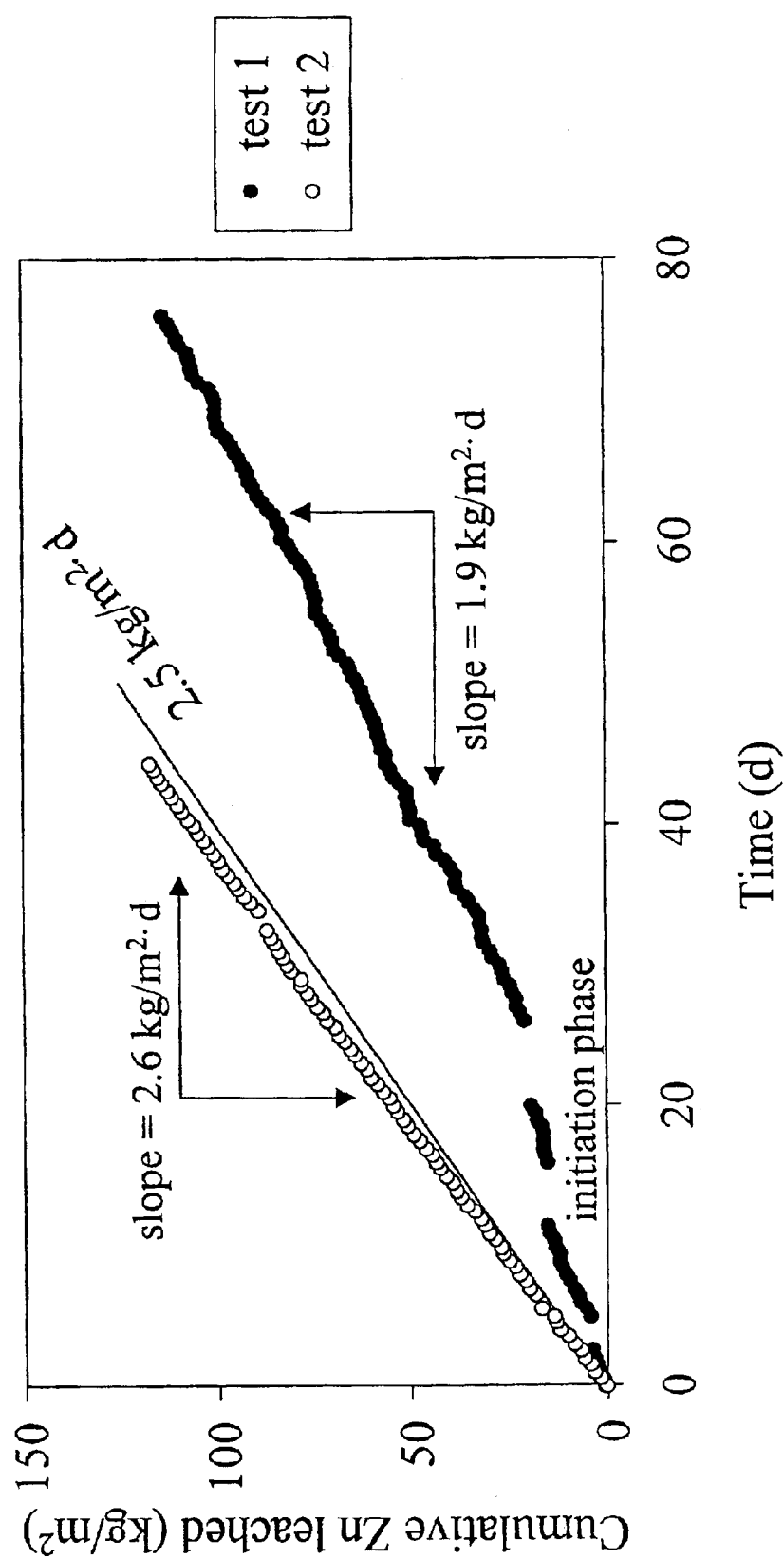
FIG. 16 is a graph showing the amounts of zinc extracted versus time for two pilot plant tests.

This example demonstrates that the heap leaching operation is capable of achieving the desired leaching rates when operated according to the preferred embodiment of the invention and in harmony with the other unit operations of the integrated process. In order to maintain all unit operations in balance without restricting the leaching step, only one half of the heap was operated in test 2. During test 1, the heap was operated at lower aeration rates and temperatures resulting in lower zinc extraction rates than those realized in test 2. The results are shown in FIG. 16.

Test 2 was operated at more preferred conditions (higher temperatures and aeration rates) according to the preferred embodiment of the invention and the process parameters were within the regime of the best mode of operation for the process.

Zinc Electrowinning from Manganese-Free Electrolytes

It is known from the literature and to those skilled in the art that the higher the silver content in binary Pb—Ag alloys, the lower the corrosion rate. It also known, that in absence of manganese in the electrolyte, the corrosion rate increases as the acid content increases. Such corrosion results in lead contamination of the zinc product and lessens the useful life of the anode in zinc electrowinning (Zn EW) operations.

The quality of the electrolytes obtained from solvent extraction (SX) is much better than those used in conventional Zn EW systems. Conventional electrolytes contain many ions, such as manganese, which are present in SX electrolytes only in trace quantities. In particular, conventional Zn EW processes rely on the presence of Mn in the electrolyte to form a thick and adherent layer of $MnO_2$ on the anodes which decreases anode corrosion and Pb deportment to the cathode. The conventional Zn EW process can be modified to treat sulphate-based SX electrolytes provided that:

1) A suitable anode and anode pre-conditioning treatment is found. In a Mn-free electrolyte, Pb0.75Ag (0.75% Ag) anodes corrode excessively.
2) Mn is added to the electrolyte to create a protective $MnO_2$ layer on the anodes.

Option 1 is preferred as Option 2 adds to the operating costs as follows:

a) Mn metal/salts have to be purchased and dissolved in the electrolyte.
b) $Mn^{+2}$ oxidation produces $MnO_2$, $Mn^{+3}$ and $Mn^{+7}$ that decrease current efficiency.
c) $Mn^{+3}$ and $Mn^{+7}$ ions could harm/degrade the SX reagents.
d) Cells and anodes have to be periodically cleaned to remove the precipitated $MnO_2$-containing mud.

The ideal anode and anode pre-conditioning treatment should be capable of producing special high grade (SHG) Zn from electrolytes derived from SX and containing very little or no Mn (<10 mg/L). It has now been found that certain pre-conditioned PbAg and PbAgBi anodes can be used to electrowin Zn from Mn-free electrolytes whilst obtaining SHG Zn quality or better. Comparative examples are presented.

Example 18

This example provides background understanding on the use of normal Pb0.75Ag anodes.

Prior to its use in the typical Zn EW process, anodes are normally pre-treated to minimise anode corrosion and Pb deportment to the cathode Zn (e.g., to obtain less than 30 ppm Pb in the cathode within the first week of EW). These pre-treatments can be done electrochemically (in a $H_2SO_4$/KF electrolyte), chemically (in a $H_2SO_4/KMnO_4$ solution) or mechanically (e.g. by sandblasting). These treatments and their combinations were studied and it was found that all of them could be used to lower the anode corrosion rate and the deportment of Pb to cathode Zn in both Mn-containing and Mn-free electrolytes.

Experiments were carried out using small-scale EW cells (one anode, one cathode per cell). Exposed anode and cathode size was 1 $cm^2$. Aluminum cathodes were used. Current density was set at 440 $A/m^2$ and deposition time varied between 40 and 66 h. Five batch electrodeposition cycles were carried out for a total of 236 h of EW. Electrolyte volume was the same in each cell (500 mL) and electrolyte temperature was 37° C.±1° C. Fresh electrolyte was used in each run and glue additions were only done at the beginning of each test (5 mg/L). High purity ZnO and reagent grade $H_2SO_4$ were used to prepare synthetic electrolytes A1, A2, and A3. Electrolyte A4 was prepared from a conventional zinc plant neutral feed solution and reagent grade $H_2SO_4$. These electrolytes contained 50 to 55 g/L Zn and 160 to 170 g/L $H_2SO_4$.

TABLE 7

Comparison between "as is" and sandblasted Pb0.75Ag anodes.

| Electrolyte Type | Electroylte [Mn], mg/L | Current Efficiency (CE) % Ave. | Std. Dev. | Min. | Max. | Pb in cathode ppm Ave. | Std. Dev. | Min. | Max. |
|---|---|---|---|---|---|---|---|---|---|
| "As Is" | | | | | | | | | |
| A1 | 0 | 92.1 | 1.8 | 89.0 | 93.4 | 282 | 167 | 107 | 558 |
| A2 | 50 | 93.9 | 0.3 | 93.6 | 94.3 | 186 | 74 | 109 | 300 |
| A3 | 200 | 87.5 | 0.2 | 87.2 | 87.8 | 52 | 22 | 39 | 91 |
| A4 | 1100 | 77.1 | 11.2 | 57.3 | 83.3 | 20 | 7 | 10 | 28 |
| Sandblasted | | | | | | | | | |
| A1 | 0 | 90.5 | 1.5 | 88.5 | 91.9 | 46 | 15 | 32 | 71 |
| A2 | 50 | 92.9 | 0.5 | 92.4 | 93.3 | 58 | 9 | 46 | 70 |
| A3 | 200 | 86.8 | 2.0 | 83.8 | 88.5 | 45 | 6 | 38 | 54 |
| A4 | 1100 | 78.0 | 5.4 | 68.5 | 81.3 | 24 | 32 | 8 | 82 |

The data shown in Table 7 summarises EW results obtained at different concentrations of Mn in the electrolyte using Pb0.75Ag "as is" (i.e., polished) and sandblasted (with olivine) anodes. It is seen that increases in Mn can result in lower current efficiency (CE) and lower Pb in cathode. The low current efficiency observed at high Mn concentrations is linked to anodic formation of $Mn^{+3}$ (and of $MnO_2$ at the anode and at the electrolyte) and its cathodic reduction. Sandblasting improves the performance of the anodes reducing the amount of Pb deported to the cathode.

Thus, it is evident that in Mn-free electrolytes, Pb0.75Ag anodes need to be pre-conditioned (e.g., by sandblasting). However, Pb deportment to cathode Zn is erratic (as loose layers of anodic products could become detached) and it is difficult to consistently obtain the required purity (e.g., <30 ppm Pb in Zn). The addition of $SrCO_3$ is known to help remove soluble Pb from the electrolyte, effectively helping to decrease Pb in cathode. $SrCO_3$ could be added to the electrolyte to lower the concentration of soluble Pb in the electrolyte, but this will only add to the operating costs and will not reduce the anode corrosion rate.

Example 19

This example compares sandblasted anodes having different compositions.

The results presented in Table 8 were obtained from continuous Zn EW tests. Electrolyte temperature was controlled to 37±1° C. The initial synthetic cell electrolyte and advance electrolyte were prepared from 99.98% ZnO and reagent grade sulfuric acid. This ZnO contained an average of 17-ppm impurities (7 ppm Pb, 2 ppm Cd, 2 ppm Fe, 5 ppm Cl). $SrCO_3$ was not added. Tests were undertaken without the addition of Mn to the electrolyte.

One central anode and two opposing aluminum cathodes were used. Immersed anode dimensions were 4.0 cm wide× 9.5 cm long. Immersed cathode dimensions were 7.0 cm wide×9 cm long. Electrolyte cell volume was 2.7 L. Experiments were run at a cathodic current density of 444 $A/m^2$ and an anodic current density of 737 $A/m^2$. All anodes were sandblasted prior to the beginning of the test.

TABLE 8

Continuous lab-cell experimental results.

| Cycle No. | 1 | 2 | 3 |
|---|---|---|---|
| Cycle Time, h | 64.9 | 65.9 | 58.9 |
| Anode Type | Pb in cathode, ppm | | |
| Pb0.75Ag rolled | 51 | 87 | 88 |
| Pb0.8Ag cast | 220 | 93 | 60 |
| Pb1.3Ag cast | 102 | 59 | 100 |
| Pb2Ag cast | 70 | 32 | 26 |
| Pb0.8Ag1.7Bi | 43 | 17 | 23 |

Manganese-free synthetic zinc sulphate electrolyte
All anodes were sandblasted

From the results shown in Table 8, it can be seen that Pb in cathode was high with the Pb0.75Ag rolled anode. Increasing the Ag content in the cast PbAg anodes from 0.8% to 1.3% did not result in a significant drop in Pb in cathode. However, once the Ag content was increased to 2%, much lower Pb in cathode values were obtained. Cathodes low in Pb were also obtained with the PbAgBi anodes. Thus, the Pb2Ag anode performed better than the anode containing less than 2% Ag, as did the Pb0.8Ag1.7Bi anode. With these anodes it should be possible to consistently obtain very low Pb in cathode (<30 ppm) in Mn-free electrolytes.

Example 20

This example gives comparisons at different current densities.

The data presented in this example were obtained using electrolytes derived from column leaching and solvent extraction as described previously. Residual organics from the SX step were removed using coalescer and activated carbon columns. Data presented in Table 9 were obtained under similar experimental conditions as those presented in the previous example. Results are presented at cathodic current densities (CCD) of 280 and 440 A/m2 and anodic current densities (ACD) of 460 and 740 A/m2 respectively. Sandblasted cast anodes were used. Electrowinning was carried out for a total of 377 hours (7 EW cycles lasting between 38 and 75 h each).

TABLE 9

Comparisons at different current densities.

| Cell | Anode Used | ACD $A/m^2$ | Electroylte | Average [Pb] cathode ppm |
|---|---|---|---|---|
| 1 | Pb2Ag | 460 | Derived | 29 |
| 2 | Pb0.7Ag1.9Bi | | from | 52 |
| 3 | Pb1.2Ag | | column | 74 |
| 4 | Pb2Ag | 740 | leaching | 26 |
| 5 | Pb0.8Ag1.7Bi | | and | 31 |
| 6 | Pb1.2Ag | | SX experiments | 106 |

From the data it can be seen that there is a difference between Pb in cathode obtained from the Pb1.2Ag anode and that obtained from the Pb2Ag anode. 2% Ag is needed in binary PbAg anodes to obtain Zn with less than 30 ppm Pb. The Pb0.8Ag1.7Bi anode gave encouraging results.

The results obtained from these tests demonstrate that the Pb2Ag anode is the alloy of choice in Mn-free electrolytes. The difference in Pb in cathode obtained between the Pb2Ag and the Pb1.2Ag anodes is significant, indicating that the Pb1.2Ag anodes may not perform well in this application even at current density as low as 460 $A/m^2$. Anodes made from a PbAgBi alloy are a viable alternative.

Example 21

Further tests were carried out in a mini-pilot plant capable of producing up to 1.3 kg of cathode Zn per day in a single EW cell that had up to 7 anodes and 6 cathodes. Cathodes were 90 mm apart (centre-to-centre).

The anodes were sandblasted, rolled Pb2Ag. Residual organics from the SX step were removed using coalescer and activated carbon columns. Zn and $H_2SO_4$ concentrations in the EW cells ranged from 50 g/L to 71 g/L and from 155 g/L to 200 g/L respectively. Experiments were carried out for a total of 139 days. No $SrCO_3$ was added to the electrolyte. Pb in cathode for the whole period averaged 34 ppm. However, as shown in Table 10, during the last 8 EW cycles, Pb in cathode was 18±8 ppm, whilst Ê (direct current specific energy consumption) averaged 2704 kWh/tonne of Zn, at an average current efficiency (CE) of 94.3%. These Ê values were consistently obtained when the advance electrolyte had very low levels of impurities (i.e. Co<0.4 mg/L, Sb<0.01 mg/L, As<0.01 mg/L, Ni<0.1 mg/L).

TABLE 10

Long-term tests using Pb2Ag anodes.

| Cycle number | 87 | 88 | 89 | 90 | 91 | 92 | 93 | 94 | average |
|---|---|---|---|---|---|---|---|---|---|
| Cycle time, h | 23.8 | 66.3 | 49.5 | 47.6 | 73.1 | 46.3 | 45.6 | 71.3 | 52.9 |
| CE, % | 95.2 | 93.7 | 94.4 | 94.3 | 93.9 | 94.3 | 93.3 | 95.0 | 94.3 |
| E, kWh/tonne zinc | 2760 | 2698 | 2808 | 2651 | 2655 | 2682 | 2718 | 2660 | 2704 |
| CCD, A/m$^2$ | 451 | 457 | 459 | 358 | 354 | 408 | 415 | 412 | 414.4 |
| ACD, A/m$^2$ | 773 | 732 | 735 | 574 | 597 | 653 | 664 | 660 | 669.8 |
| Pb in cathode, ppm | 36 | 19 | 16 | 14 | 16 | 13 | 12 | 15 | 18 |

Sandblasted rolled anodes; Mini pilot plant electrolyte CCD (cathodic current density); ACD (anodic current density)

The cathodes produced were also very pure. For the last 7 runs they contained 4±4 ppm Al, 2±1 ppm Cd and <1 ppm each for As, Bi, Co, Cr, Ni, Sb, Sn, Tl, Cu, Fe. Thus, the integrated process described in this specification can produce Zn of much higher purity than SHG Zn. The purity of the solutions is so high that very pure Zn salts could also be made. The EW process can be applied to any sulphate-based SX solution from which Zn needs to be electrowon (e.g. for treatment of oxidic/silicate ores).

Although certain preferred embodiments of the present invention have been shown and described in detail, it should be understood that various changes and modifications may be made therein without departing from the scope of the appended claims.

References

1. T. M. Hearne, R. Haegele and R. D. Beck, *Hydrometallurgical recovery of zinc from sulphide ores and concentrates*, Zinc and Lead Processing, Dutrizac, J. E. et al. (eds.), The Metallurgical Society of CIM, 1998, pp. 765–780.
2. Yasuhiro Konishi, Hideaki Kubo and Satoru Asai, *Bioleaching of Zinc Sulfide Concentrate by Thiobacillus ferrooxidans*, Biotechnology and Bioengineering, Vol. 39, pp. 66–74 (1992).
3. Åke Sandström, Jan-Eric Sundkvist and Stig Petersson, *Bio-oxidation of a complex zinc sulphide ore: A study performed in continuous bench-and pilot scale*, Biomine 97, Australian Mineral Foundation Conference, Glenside, Australia, 1997, pp. M1.1.1–M1.1.11.
4. M. L. Steemson, F. S. Wong and B. Goebel, *The integration of zinc bioleaching with solvent extraction for the production of zinc metal from zinc concentrates*, International Biohydrometallurgy Symposium—Biomine 97, Australian Mineral Foundation Conference, Glenside, Australia, 1997, pp. M1.4.1–M1.1.10.
5. Christopher Krafft and Rolf. O. Hallberg, *Bacterial leaching of two Swedish zinc sulfide ores*, FEMS Microbiology Reviews, Vol. 11 (1993), pp. 121–128.
6. J. E. Dutrizac, *Ferric sulphate percolation leaching of a pyritic Zn—Pb—Cu ore*, CIM Bulletin, October 1979 pp. 109–118.

What is claimed is:

1. A method of extracting zinc from a sulphidic ore, comprising the steps of:
    selecting a sulphidic ore having a maximum particle size of about 50 mm;
    forming the ore into a heap and bio-oxidizing the ore in the heap with acidophilic microorganisms by providing air to the bottom of the heap at a rate of at least 5 L/m$^2$·min and irrigating the top of the heap with an acidic solution containing up to about 30 g/L sulphuric acid at a rate of at least about 0.15 L/m$^2$·min to produce a pregnant leach solution containing zinc in solution; and
    recovering zinc from the pregnant leach solution.

2. The method according to claim 1, wherein zinc is extracted from the ore in the heap at an average rate of about 2.5 kg/m$^2$·d, whereby the average concentration of zinc in the acid solution is increased during passage through the heap to produce the pregnant leach solution.

3. The method according to claim 2, wherein the average concentration of zinc in the acid solution is increased by up to about 20 g/L.

4. The method according to claim 2, wherein the average concentration of zinc in the acid solution is increased by at least about 5 g/L.

5. The method according to claim 1, wherein the acidic solution contains about 15 g/L sulphuric acid.

6. The method according to claim 1, wherein the acidic solution contains about 15 g/L to 30 g/L sulphuric acid.

7. The method according to claim 1, wherein the acidic solution has a sufficient acid content to counteract iron precipitation in the heap.

8. The method according to claim 1, wherein the pregnant leach solution has a pH≦4.

9. The method according to claim 1, wherein the pregnant leach solution has a pH≦3.0.

10. The method according to claim 1, wherein the pregnant leach solution has a pH≦2.5.

11. The method according to claim 1, wherein the pregnant leach solution has a pH≦2.0.

12. The method according to claim 1, wherein the acidic solution contains iron.

13. The method according to claim 12, wherein the acidic solution contains at least about 0.04 g/L iron.

14. The method according to claim 12, wherein the acidic solution contains at least about 0.5 g/L iron.

15. The method according to claim 1, wherein the bio-oxidizing of the ore is carried out at an average temperature of at least about 30° C.

16. The method according to claim 1, wherein the bio-oxidizing of the ore is carried out at an average temperature of at least about 35° C.

17. The method according to claim 1, wherein the bio-oxidizing of the ore is carried out at an average temperature of about 30° C. to 85° C.

18. The method according to claim 1, wherein the bio-oxidizing of the ore is carried out at an average temperature of about 35° C. to 70° C.

19. The method according to claim 1, further comprising the step of recovering the pregnant leach solution at a temperature of at least 30° C. at the bottom of the heap.

20. The method according to claim 1, further comprising the step of recovering the pregnant leach solution at a temperature of at least 35° C. at the bottom of the heap.

21. The method according to claim 1, wherein said maximum particle size is about 25 mm.

22. The method according to claim 1, wherein said maximum particle size is about 12 mm.

23. The method according to claim 1, wherein the ore having said maximum particle size is produced by subjecting a larger particle size ore to crushing to reduce the ore to said maximum particle size.

24. The method according to claim 23, wherein after said crushing, the ore is subjected to agglomeration prior to the step of forming the ore into a heap.

25. The method according to claim 24, wherein said agglomeration is effected with water.

26. The method according to claim 24, wherein said agglomeration is effected with a solution containing iron.

27. The method according to claim 24, wherein said agglomeration is effected with an acidic solution.

28. The method according to claim 24, wherein said agglomeration is effected with acid mine drainage.

29. The method according to claim 1, wherein the microorganisms are indigenous to the ore.

30. The method according to claim 1, wherein the ore is inoculated directly or indirectly with said microorganisms.

31. The method according to claim 30, wherein the ore is inoculated with the microorganisms by adding to said ore an acid mine drainage solution containing indigenous microorganisms.

32. The method according to claim 1, wherein the heap has a height of at least 2 meters.

33. The method according to claim 1, wherein the heap has a height of at least 3 meters.

34. The method according to claim 1, wherein the heap has a height of at least 5 meters.

35. The method according to claim 1, wherein the heap has a height of about 2 to 10 meters.

36. The method according to claim 1, wherein the heap has a height of about 4 to 8 meters.

37. The method according to claim 1, wherein the heap has a height of about 6 meters.

38. The method according to claim 1, wherein the ore is derived from a sedimentary exhalative deposit.

39. The method according to claim 1, wherein the ore is derived from a volcanogenic massive sulphide deposit.

40. The method according to claim 1, wherein the ore is derived from a carbonate replacement deposit.

41. The method according to claim 1, wherein the ore contains zinc in the form of a zinc sulphide mineral.

42. The method according to claim 41, wherein the zinc sulphide mineral is sphalerite.

43. The method according to claim 41, wherein the zinc sulphide mineral is marmatite.

44. The method according to claim 41, wherein the zinc sulphide mineral is wurtzite.

45. The method according to claim 1, wherein the ore is a zinc-copper ore and the pregnant leach solution contains both zinc and copper in solution, further comprising the steps of removing zinc and copper from the pregnant leach solution by separate solvent extraction steps.

46. The method according to claim 45, wherein the copper is removed from the pregnant leach solution by solvent extraction prior to the removal of zinc.

47. The method according to claim 1, wherein the ore is a complex zinc-containing ore.

48. The method according to claim 1, wherein the ore is a predominantly suiphidic ore.

49. The method according to claim 1, wherein the ore is selected from the group consisting of a complex ore, mixed ore, weathered ore, partially oxidized ore, oxidic ore and siliceous ore, which ore still contains some sulphidic minerals.

50. The method according to claim 1, wherein the ore contains at learnt 3% zinc.

51. The method according to claim 1, wherein the ore contains at least 5% zinc.

52. The method according to claim 1, wherein the ore contains at least 10% zinc.

53. The method according to claim 1, wherein said microorganisms are selected from the group consisting of mesophiles, thermophiles and extreme thermophales.

54. The method according to claim 1, wherein said microorganisms are selected from the group consisting of *Acidithiobacillus spp.* (*Acidithiobacillus ferrooxidans, Acidithiobacillus thiooxidans, Acidithiobacillus caldus*); *Leptospirillum spp.* (*Leptospirillum ferrooxidans*); *Acidiphilium spp.* (*Acidiphilium cryptum*); *Ferromicrobium acidophilus; Ferroplasma acidiphilum; Sulfobacillus spp.* (*Sulfobacillus thermosulfidooxidans, Sulfobacillus acidophilus*); *Alicyclobacillus spp.* (*Alicyclobacillus acidocaldrius*); *Acidimicrobium ferrooxidans; Sulfolobus spp.* (*Sulfolobus metallicus*); *Acidianus spp.* (*Acidianus infernus*); *Metallosphaera spp.* (*Metallosphaera sedula*); and *Thermoplasma spp.* (*Thermoplasma acidophilum*).

55. The method according to claim 1, further comprising the step of recycling a portion of the pregnant leach solution to the heap.

56. The method according to claim 55, wherein the pregnant leach solution being recycled contains at least about 0.04 g/L iron.

57. The method according to claim 55, wherein the pregnant leach solution being recycled contains at least about 0.5 g/L iron.

58. The method according to claim 1, further comprising the step of subjecting the pregnant leach solution to solvent extraction to obtain a concentrated zinc solution and a raffinate.

59. The method according to claim 58, wherein zinc is only partially extracted during said solvent extraction.

60. The method according to claim 59, wherein zinc is extracted in an amount of about 30–50% of zinc in the pregnant leach solution.

61. The method according to claim 58, wherein the ore is subjected to crushing to produce said maximum particle size and after said crushing, the ore is subjected to agglomeration, and further comprising the step of recycling the raffinate for use in effecting said agglomeration.

62. The method according to claim 58, a further comprising the step of subjecting the pregnant leach solution to neutralization to a pH of about 4 to 4.5 prior to said solvent extraction.

63. The method according to claim 62, wherein the neutralization is carried out in the absence of forced aeration.

64. The method according to claim 58, further comprising the step of recycling at least part of the raffinate for use as said acidic solution for irrigating the heap.

65. The method according to claim 64, wherein the raffinate being recycled contains at least about 0.04 g/L iron.

66. The method according to claim 64, wherein the raffinate being recycled contains at least about 0.5 g/L iron.

67. The method according to claim 58, wherein zinc is recovered from the concentrated zinc solution by means of precipitation.

68. The method according to claim 58, wherein zinc is recovered from the concentrated zinc solution in the form of a zinc compound.

69. The method according to claim 68, wherein the zinc compound is selected from the group consisting of zinc hydroxide, zinc sulphate, zinc oxide, zinc carbonate and zinc oxalate.

70. The method according to claim 58, further comprising the step of subjecting the concentrated zinc solution to electrowinning to recover zinc therefrom.

71. The method according to claim 70, wherein the electrowinning is carried out in the presence of manganese.

72. The method according to claim 70, wherein the electrowinning is carried out in the presence of manganese using an anode comprising 0.5 to 1.0% by weight of a silver-lead alloy.

73. The method according to claim 70, wherein the electrowinning is carried out in the absence of manganese in the concentrated zinc solution.

74. The method according to claim 73, wherein the electrowinning is carried out using an anode of a silver-lead alloy comprising at least 1% silver by weight.

75. The method according to claim 74, wherein the electrowinning is carried out using an anode of a silver-lead alloy comprising about 2% silver by weight.

76. The method according to claim 73, wherein the electrowinning is carried out using an anode comprising a bismuth-silver-lead alloy.

77. The method according to claim 76, wherein the alloy comprises about 0.7 to 0.8% by weight of silver and about 1.7 to 1.9% by weight of bismuth.

78. The method according claim 70, wherein the electrowinning is carried out using an aluminum cathode and wherein zinc metal is deposited on said cathode during the electrowinning to produce cathode zinc.

79. The method according to claim 78, further comprising the step of melting the cathode zinc to produce molten zinc and casting the molten zinc into ingots.

80. The method according to claim 1, further comprising the step of providing a nutrient to the microorganisms.

81. The method according to claim 80, wherein the nutrient comprises nitrogen in the form of an ammonium salt and a source of potassium and phosphorous.

82. The method according to claim 1, wherein air is provided to the bottom of the heap at a rate of at least 10 L/m$^2$·mm.

83. A method of extracting zinc from a sulphidic ore, comprising the steps of:
    selecting a sulphidic ore derived from the group consisting of a sedimentary exhalative type deposit and a volcanogenic massive sulphide type deposit;
    forming the ore into a heap and bio-oxidizing the ore in the heap with acidophilic microorganisms by providing air to the bottom of the heap at a rate of at least 5 L/m$^2$·min and irrigating the top of the heap with an acidic solution containing up to about 30 g/L sulphuric acid at a rate of at least about 0.15 L/m$^2$·min to produce a pregnant zinc solution containing zinc in solution;
    recycling a first portion of the pregnant leach solution to the heap; and
    recovering zinc from a second portion of the pregnant leach solution.

84. The method according to claim 83, wherein the second portion of the pregnant leach solution is subjected to solvent extraction to obtain a concentrated zinc solution and a raffinate.

85. The method according to claim 84, further comprising the step of subjecting the pregnant leach solution to neutralization to a pH of about 4 to 4.5 prior to said solvent extraction.

86. The method according to claim 85, wherein said neutralization is carried out in the absence of forced aeration.

87. The method according to claim 84, further comprising the step of recycling at least part of the raffinate for use as said acidic solution for irrigating the heap.

88. The method according to claim 84, wherein zinc is only partially extracted during said solvent extraction.

89. The method according to claim 88, wherein the zinc is extracted in an amount of about 30–50% of zinc in the pregnant solution.

90. A method of extracting zinc from a sulphidic ore, comprising the steps of:
    heap leaching the ore with an acidic leach solution in the presence of acidophilic microorganisms to produce a pregnant leach solution containing zinc in solution and manganese, if present;
    subjecting the pregnant leach solution to zinc solvent extraction to obtain a manganese-free concentrated zinc solution and a raffinate; and
    subjecting the concentrated zinc solution to electrowinning to recover zinc therefrom, wherein the electrowinning is carried out in the absence of manganese in the concentrated zinc solution.

91. The method according to claim 90, wherein zinc is only partially extracted during said solvent extraction.

92. The method according to claim 91, wherein the zinc is extracted in an amount of about 30–50% of zinc in the pregnant leach solution.

93. The method according to claim 90, wherein the electrowinning is carried out using an anode of a silver-lead alloy comprising at least 1% silver by weight.

94. The method according to claim 93, wherein the electrowinning is carried out using an anode of a silver-lead alloy comprising about 2% silver by weight.

95. The method according to claim 90, wherein the electrowinning is carried out using an anode comprising a bismuth-silver-lead alloy.

96. The method according to claim 95, wherein the alloy comprises about 0.7 to 0.8% weight of silver and about 1.7 to 1.9% by weight of bismuth.

97. The method according to claim 90, further comprising the step of subjecting the pregnant zinc solution to neutralization to a pH of about 4 to 4.5 prior to said solvent extraction.

98. The method according to claim 97, wherein the neutralization is carried out in the absence of forced aeration.

99. The method according to claim 90, further comprising the step of recycling the raffinate for use as said acidic leach solution.

100. The method according to claim 90, wherein the heap leaching of the ore is carried out at an average temperature of from about 30 to 85° C. in the heap.

101. The method according to claim 90, wherein the heap leaching is carried out at an average temperature of about 35° C. to 70° C.

102. The method according to claim 90, wherein the ore contains at least 5% zinc.

103. The method according to claim 90, further comprising the step of taking a bleed stream from the pregnant leach solution, thereby to remove impurities.

104. The method according to claim 103, further comprising the step of treating the bleed stream for the removal of impurities therefrom.

105. The method according to claim 103, further comprising the step of subjecting the bleed stream to solvent extraction to produce a zinc solution and a raffinate which is subjected to said treatment for the removal of impurities therefrom.

106. The method according to claim 103, wherein the bleed stream is preheated to at least about 50° C. and treated in a first stage of treatment for the removal of cadmium therefrom by cementation with zinc dust to produce a zinc-cadmium cementation product and a liquor.

107. The method according to claim 106, wherein the liquor from the first stage of treatment is heated to at least 80° C. and then subjected to a second stage of treatment wherein the liquor is subjected to neutralization to a pH of about 6 to produce a basic zinc sulphate precipitate and a liquor.

108. The method according to claim 107, wherein the basic zinc sulphate is recycled to said neutralization of the pregnant leach solution to recover zinc therefrom.

109. The method according to claim 107, wherein the liquor from the second stage of treatment is subjected to a third stage of treatment with lime slurry to a pH of about 10 for the removal of heavy metals therefrom and then discarded.

110. The method according to claim 90, further comprising the step of taking a bleed stream from the raffinate, thereby to remove impurities from the raffinate.

111. The method according to claim 110, further comprising the step of treating the bleed stream for the removal of impurities therefrom.

112. A method of extracting zinc from a sulphidic ore also containing iron, comprising the steps of:
subjecting the ore to a heap leach with an acidic solution in the presence of acidophilic microorganisms by providing air to the bottom of the heap at a rate of at least 5 $L/m^2 \cdot min$ to produce a pregnant leach solution containing zinc and ferrous and ferric iron;
subjecting the leach solution to neutralization without the benefit of forced air flow to the leach solution, thereby maintaining the presence of the ferrous iron in the neutralized solution;
subjecting the neutralized solution to zinc solvent extraction with an organic extractant to produce a loaded extractant and a raffinate containing ferrous iron in solution;
stripping the loaded organic with a solution to produce a concentrated zinc solution; and recycling at least part of the raffinate to the heap leach.

113. The method according to claim 112, further comprising the step of treating the concentrated zinc solution to recover a zinc compound therefrom.

114. The method according to claim 112, further comprising the step of subjecting the concentrated zinc solution to electrowinning to recover zinc therefrom.

115. The method according to claim 112, further comprising the step of subjecting the organic to an iron removal step to remove any ferric iron contained in said organic, therefrom.

116. A method of extracting zinc from a sulphidic ore, comprising the steps of:
selecting an ore having a maximum particle size of about 50 mm;
forming the ore into a heap and bio-oxidizing the ore in the heap with acidophilic microorganisms;
further comprising the steps of:
providing air to the bottom of the heap at a rate of at least 5 $L/m^2 \cdot min$; and
irrigating the top of the heap with an acidic solution containing up to about 30 g/L sulphuric acid at a rate of about 0.15 $L/m^2 \cdot min$ to extract zinc from the ore in the heap at an average rate of about 2.5 $kg/m^2 \cdot d$, whereby the average concentration of zinc in the acid solution is increased by about up to 20 g/L during passage through the heap to produce a pregnant leach solution containing zinc in solution.

117. A method of extracting zinc from a sulphidic ore, comprising the steps of:
heap leaching the ore with an acidic leach solution in the presence of acidophilic microorganisms to produce a pregnant leach solution containing zinc in solution and manganese, if present;
subjecting the pregnant leach solution to zinc solvent extraction to obtain a manganese-free concentrated zinc solution and a raffinate; and
treating at least a portion of the concentrated zinc solution to recover a zinc compound therefrom.

118. The method according to claim 117, wherein the zinc compound is selected from the group consisting of zinc hydroxide, zinc sulphate, zinc oxide, zinc carbonate and zinc oxalate.

119. A method of extracting zinc from a sulphidic ore, comprising the steps of;
heap leaching the ore with an acidic leach solution in the presence of acidophilic microorganisms to produce a pregnant leach solution containing zinc in solution and manganese, if present;
subjecting the pregnant leach solution to zinc solvent extraction to obtain a manganese-free concentrated zinc solution and a raffinate, wherein zinc is only partially extracted during said solvent extraction, the solvent extraction being carried out in the absence of neutralization;
and recycling at least part of the raffinate to the heap leaching.

120. A method of extracting zinc from a solution containing zinc, as well as manganese, if present, comprising the steps of:
subjecting the zinc solution to zinc solvent extraction to obtain a manganese-free concentrated zinc solution and a raffinate; and
subjecting the concentrated zinc solution to electrowinning to recover zinc therefrom, wherein the electrowinning is carried out in the absence of manganese in the concentrated zinc solution.

121. The method according to claim 120, wherein the zinc solution is obtained by leaching a zinc ore or concentrate.

122. The method according to claim 120, wherein the zinc solution is obtained by leaching an electric arc furnace dust.

123. The method according to claim 120, wherein the zinc solution is obtained by leaching a recyclable zinc containing material.

124. The method according to claim 120, wherein the electrowinning is carried out using an anode of a silver-lead alloy comprising at least 1% silver by weight.

125. The method according to claim 124, wherein the electrowinning is carried out using an anode of a silver-lead alloy comprising about 2% silver by weight.

126. The method according to claim 121, wherein the ore is an oxidic ore.

127. The method according to claim 121, wherein the ore or concentrate is a sulphidic ore or concentrate.

128. The method according to claim 120, a further comprising the step of subjecting the zinc solution to neutralization to a pH of about 4 to 4.5 prior to said solvent extraction.

129. The method according to claim 128, wherein the neutralization is carried out in the absence of forced aeration.

130. The method according to claim 124, wherein the electrowinning is carried out using an anode comprising a bismuth-silver-lead alloy.

131. The method according to claim 130, wherein the alloy comprises about 0.7 to 0.8% by weight of silver and about 1.7 to 1.9% by weight of bismuth.

132. A method of extracting zinc from a sulphidic ore, comprising the steps of:

selecting a sulphidic ore having a maximum particle size of about 50 mm;

forming the ore into a heap and bio-oxidizing the ore in the heap with acidophilic microorganisms by providing air to the bottom of the heap at a rate of at least 5 $L/m^2 \cdot min$ and irrigating the top of the heap with an acidic solution containing at least about 30 g/L sulphuric acid at a rate of at least about 0.15 $L/m^2 \cdot min$ to produce a pregnant leach solution containing zinc in solution; and recovering zinc from the pregnant leach solution.

* * * * *